United States Patent
Zdilla et al.

(10) Patent No.: US 10,381,684 B2
(45) Date of Patent: Aug. 13, 2019

(54) SOFT-SOLID CRYSTALLINE ELECTROLYTE COMPOSITIONS AND METHODS FOR PRODUCING THE SAME

(71) Applicant: Temple University—Of The Commonwealth System of Higher Education, Philadelphia, PA (US)

(72) Inventors: Michael J. Zdilla, Wallingford, PA (US); Stephanie L. Wunder, Chadds Ford, PA (US); Parameswara Rao Chinnam, Ambler, PA (US)

(73) Assignee: TEMPLE UNIVERSITY—OF THE COMMONWEALTH SYSTEM OF HIGHER EDUCATION, Philadelphia, PA (US)

( * ) Notice: Subject to any disclaimer, the term of this patent is extended or adjusted under 35 U.S.C. 154(b) by 156 days.

(21) Appl. No.: 15/129,342

(22) PCT Filed: Mar. 20, 2015

(86) PCT No.: PCT/US2015/021725
§ 371 (c)(1),
(2) Date: Sep. 26, 2016

(87) PCT Pub. No.: WO2015/148300
PCT Pub. Date: Oct. 1, 2015

(65) Prior Publication Data
US 2017/0179524 A1    Jun. 22, 2017

Related U.S. Application Data

(60) Provisional application No. 61/970,146, filed on Mar. 25, 2014.

(51) Int. Cl.
*H01M 10/056* (2010.01)
*H01M 10/0565* (2010.01)
(Continued)

(52) U.S. Cl.
CPC ......... *H01M 10/0565* (2013.01); *H01M 4/02* (2013.01); *H01M 6/14* (2013.01);
(Continued)

(58) Field of Classification Search
CPC ............ H01M 4/02; H01M 6/14; H01M 6/16; H01M 6/36; H01M 6/162; H01M 10/0565
(Continued)

(56) References Cited

U.S. PATENT DOCUMENTS

| | | |
|---|---|---|
| 3,977,900 A | 8/1976 | Luehrs |
| 4,397,922 A | 8/1983 | Pokhodenko |
| 5,102,510 A | 4/1992 | Darian |

(Continued)

FOREIGN PATENT DOCUMENTS

| | | |
|---|---|---|
| DE | 102006046787 A1 | 4/2008 |
| JP | 03011564 A | 1/1991 |

(Continued)

OTHER PUBLICATIONS

Andreev, et al., "Crystal Structures of Poly(Ethylene Oxide)3:LiBF4 and (Diglyme)n:LiBF4 (n=1,2)", Chem. Mater., 2005, 17 (4), pp. 767-772.

(Continued)

*Primary Examiner* — Amanda C. Walke
(74) *Attorney, Agent, or Firm* — Riverside Law LLP

(57) ABSTRACT

The present invention relates to compositions comprising ionic compounds surrounded by organic matrices, and methods for producing such compositions. In various embodiments, the compositions of the present invention are co-crystals of an organic compound and a salt. The organic compound forms matrices with channel structures, wherein the organic matrices interact relatively poorly with the salt, thus allowing for excellent ion mobility through the channel structures. In one embodiment, the compositions are soft- (Continued)

solid electrolytes, comprising ions such as lithium or sodium, which can be used in batteries or other electrochemical devices. The electrolyte compositions of the present invention exhibit relatively high ionic conductivities with a negligible activation barrier for ion migration, i.e., the compositions exhibit barrierless ion conduction. In addition, the compositions exhibit good conductivities at very low temperatures, making them useful in a variety of low temperature applications. In one embodiment, the present invention further relates to free-standing films comprising the co-crystals of the present invention, and methods for preparing such films.

32 Claims, 23 Drawing Sheets

(51) Int. Cl.
   *H01M 4/02* (2006.01)
   *H01M 6/14* (2006.01)
   *H01M 6/16* (2006.01)
   *H01M 6/36* (2006.01)
   *H01M 10/052* (2010.01)

(52) U.S. Cl.
   CPC .............. *H01M 6/16* (2013.01); *H01M 6/36* (2013.01); *H01M 10/052* (2013.01); *H01M 10/056* (2013.01); *H01M 2300/0017* (2013.01); *H01M 2300/0085* (2013.01)

(58) Field of Classification Search
   USPC ..................................................... 429/231.95
   See application file for complete search history.

(56) References Cited

U.S. PATENT DOCUMENTS

| | | | | |
|---|---|---|---|---|
| 5,354,499 A * | 10/1994 | Elliott | .................... | G01N 21/81 23/295 R |
| 6,841,303 B2 | 1/2005 | Park et al. | | |
| 8,110,641 B2 | 2/2012 | Lee | | |
| 8,540,899 B2 | 9/2013 | Miller et al. | | |
| 2002/0009649 A1* | 1/2002 | Sato | .................... | H01M 10/052 429/306 |
| 2007/0218371 A1* | 9/2007 | Elliott | ................... | H01M 2/145 429/307 |
| 2010/0015496 A1* | 1/2010 | Miyake | .................. | C08J 5/2256 429/494 |
| 2011/0020731 A1* | 1/2011 | Yoshimura | ............. | C08G 61/08 429/483 |
| 2011/0224405 A1 | 9/2011 | Livingston | | |
| 2013/0004859 A1 | 1/2013 | Yu | | |
| 2014/0011067 A1* | 1/2014 | Baba | .................... | H01M 4/0471 429/124 |
| 2014/0295281 A1* | 10/2014 | Gutel | ....................... | C01B 25/45 429/224 |
| 2016/0336619 A1* | 11/2016 | Choi | ................ | H01M 10/0565 |

FOREIGN PATENT DOCUMENTS

| | | | |
|---|---|---|---|
| JP | 2008522376 A | 6/2008 | |
| JP | 2011238599 A | 11/2011 | |
| WO | 1995002314 A2 | 1/1995 | |
| WO | 02080291 A2 | 10/2001 | |
| WO | 2011075336 A1 | 6/2011 | |
| WO | 2012012743 A1 | 1/2012 | |
| WO | 2012129568 A2 | 9/2012 | |

OTHER PUBLICATIONS

Henderson, et al., "Triglyme-Li+ Cation Solvate Structures: Models for Amorphous Concentrated Liquid and Polymer Electrolytes (I)," Chem. Mater., 2003, 15 (24), pp. 4679-4684.
Henderson, et al., "Tetraglyme-Li+ Cation Solvate Structures: Models for Amorphous Concentrated Liquid and Polymer Electrolytes (II)", Chem. Mater., 2003, 15 (24), pp. 4685-4690.
Seneviratne, et al., "Characterization of Crystalline and Solution Phases of Diglyme-LiSbF6", J. Phys. Chem. B, 2004, 108 (24), pp. 8124-8128.
Zhang, et al., "Crystalline Small-Molecule Electrolytes", Angewandte Chemie Int. Ed., 2007, 46 (16), pp. 2848-2850.
Quartarone and Mustarelli, "Electrolytes for solid-state lithium rechargeable batteries: recent advances and perspectives." 2011, Chem Soc Rev 40:2525-40.
Xu, Kang, "Nonaqueous Liquid Electrolytes for Lithium-Based Rechargeable Batteries" 2004, Chemical Reviews 104(10):4303-4417.
Zaghib et al., "Safe and fast-charging Li-ion battery with long shelf life for power applications," 2011, J of Power Sources 196(8):3949-3954.
Fergus, 2010, "Ceramic and polymeric solid electrolytes for lithium-ion batteries" J of Power Sources 195 (4):4554-4569.
Kanno and Maruyama, "Lithium Ionic Conductor Thio-LISICON," 2001, J Electrochem Soc 148(7):A742-A746.
Abitelli et al., "Polyethylene oxide electrolyte membranes with pyrrolidinium-based ionic liquids," 2010, Electrochimica Acta 55(19):5478-84.
Uvarov, "Composite solid electrolytes: recent advances and design strategies," 2011, J Solid State Electrochem 15(2):367-89.
Ryu et al., "Effect of Counter Ion Placement on Conductivity in Single-Ion Conducting Block Copolymer Electrolytes" 2005, J Electrochem Soc 152(1):A158-A163.
Pringle et al., "Organic ionic plastic crystals: recent advances," 2010, J Mater Chem 20(X):2056-62.
Mauritz and Moore, "State of Understanding Nation" 2004, Chemical Reviews 104(10):4535-86.
Gadjourova et al., "Ionic conductivity in crystalline polymer electrolytes," 2001, Nature 412(6846): 520-3.
Fuentes et al., 2001 "Influence of microstructure on the electrical properties of NASICON materials," Solid State Ion 140(1-2):173-9.
Ichikawa et al., "3D Interconnected Ionic Nano-Channels Formed in Polymer Films: Self-Organization and Polymerization of Thermotropic Bicontinuous Cubic Liquid Crystals," 2011, J Am Chem Soc 133(7):2163-9.
Bhargav et al., "Structural and electrical properties of pure and NaBr doped poly (vinyl alcohol) (PVA) polymer electrolyte films for solid state battery applications," 2007, Ionics 2007, 13(6):441-6.
Kumar et al., "Studies on poly(vinylidene fluoride-co-hexafluoropropylene) based gel electrolyte nanocomposite for sodium-sulfur batteries," 2011, Solid State Ionics 202(1):45-53.
Zhao et al., "A zeolitic porous lithium-organic framework constructed from cubane clusters," 2011, Chem Commun 47:5536-8.
Rao et al., "Polyoctahedral Silsesquioxane-Nanoparticle Electrolytes for Lithium Batteries:POSS-Lithium Salts and POSS-PEGs," 2011, Chemistry of Materials 23:5111-21.
Zhang et al., "Ionic Conductivity in the Solid Glyme Complexes," 2007, J Am Chem Soc 129(28) 8700-1.
Chinnam and Wunder. "Polyoctahedral Silsequioxane-Nanoparticle Electrolytes for Lithium Batteries: POSS-Lithium Salts and POSS-PEGs." Chem Mater. vol. 23. 5111-5121 (2011).
Henderson, "Crystallization Kinetics of Glyme—LiX and PEO—LiX Polymer Electrolytes", 2007, Macromolecules 40, (14), 4963-4971.
Nakamura et al., "A molecular metal with ion-conducting channels", 1998, Nature 394 (6689), 159-162.
Tobishima et al., "Electrolytic Properties of LiCLO4—Propylene Carbonate Mixed with Amide-Solvents for Lithium Batteries", 1988, Electrochimica Acta, 33: 239.
Ma et al., "Rechargeable Na/NaxCoO2 and Na15Pb4/NaxCoO2 Polymer Electrolyte Cells", 1993, J of the Electrochemical Society 140, (10), 2726-2733.
Kumar et al., "Investigations on the effect of complexation of NaF salt with polymer blend (PEO/PVP) electrolytes on ionic conductivity and optical energy band gaps", 2011, Physica B-Condensed Matter 406, (9), 1706-1712.

(56) References Cited

OTHER PUBLICATIONS

Moriya et al., "Molecular Ionis in Supramolecular Assemblies with Channel Structures Containing Lithium Ions", Chemistry-A European J 18, 15305-15309.
Japanese Office Action for Application No. 2017-502759 dated Apr. 9, 2019.

* cited by examiner

SOFT-SOLID CRYSTALLINE ELECTROLYTE COMPOSITIONS AND METHODS FOR PRODUCING THE SAME

CROSS-REFERENCE TO RELATED APPLICATIONS

This application is the U.S. national phase application filed under 35 U.S.C. § 371 claiming benefit to International Patent Application Ser. No. PCT/US15/21725, filed Mar. 20, 2015, which claims priority under 35 U.S.C. § 119(e) to U.S. Provisional Patent Application Ser. No. 61/970,146, filed Mar. 25, 2014, the entire contents of each application are incorporated herein by reference.

STATEMENT REGARDING FEDERALLY SPONSORED RESEARCH OR DEVELOPMENT

This invention was made with government support under Grant Nos. DMR 1207221 and CBET-1437814 awarded by the National Science Foundation. The government has certain rights in the invention.

BACKGROUND OF THE INVENTION

The electrolytes currently used in electrochemical devices such as lithium/lithium ion batteries, hydrogen ion fuel cells, and solar cells are typically liquid or gel electrolytes. However, these liquid or gel electrolytes, although having good room temperature conductivities of $>1\times10^{-3}$ S/cm, have safety concerns such as leakage, explosions due to volatile solvents, dendrite formation, and faster formation/migration of degradation products than in a solid electrolyte (Xu, K., Nonaqueous, 2004, Chemical Reviews 104, (10), 4303-4417; Aurbach, D.; Zinigrad, E.; Cohen, Y.; Teller, H., Solid State Ionics 2002, 148, (3-4), 405-416; Brissot, C.; Rosso, M.; Chazalviel, J. N.; Lascaud, S., J of the Electrochemical Society 1999, 146, (12), 4393-4400). Therefore, new materials with architectures that foster enhanced ion migration over a wide temperature range are needed to replace these flammable liquid or gel electrolytes in electrochemical devices.

Solid state electrolytes have previously been investigated because of the expected increase in safety associated with solid state materials, but these electrolytes typically have relatively poor ionic conductivity (Zaghib et al., 2011, J of Power Sources 196, 3949-3954). Currently available solid electrolytes with the highest ionic conductivities are ceramic/glass and other inorganic superionic conductors, with conductivities potentially in the range of $10^{-3}$ to $10^{-2}$ S/cm (Fergus, 2010, J of Power Sources 195, 4554-4569). In the case of inorganic superionic conductors, the crystalline systems are typically more conductive than the glasses (Kanno and Maruyama, 2001, Journal of the Electrochemical Society 148 (7), A742-A746). The first reported Li$^+$ ion superionic conductor, Li$_3$N, with a high RT ionic conductivity ($6\times10^{-3}$ S/cm) for a solid electrolyte, has a low electrochemical stability window making it unsuitable as a solid electrolyte (Alpen et al., 1977, Applied Physics Letters 30 (12), 621-62; Lapp et al., 1983, Solid State Ionics 11 (2), 97-103). Other inorganic superionic solid electrolytes such as the crystalline oxide perovskite lithium lanthanum titanates (La$_{0.5}$Li$_{0.5}$TiO$_3$) (Inaguma et al., 1993, Solid State Communications 86 (10), 689-693), a series of sulfide crystals such as Li$_{4-x}$Ge$_{1-x}$P$_x$S$_4$ with the framework structure of $\gamma$-Li$_3$PO$_4$, referred to as thio-LISICON (e.g. Li$_{3.25}$Ge$_{0.25}$P$_{0.75}$S$_4$) (Kanno and Maruyama, 2001, Journal of the Electrochemical Society 148 (7), A742-A746), glass ceramics (70Li$_2$S-30P$_2$S$_5$) (Mizuno et al., 2005, Advanced Materials 17 (7), 918-921; Hayashi et al., 2008, Journal of Materials Science 43 (6), 1885-1889) and glassy materials (Li$_2$S—SiS$_2$—Li$_3$PO$_4$) (Kondo et al., 1992 Solid State Ionics 53, 1183-1186; Takada et al., 1993, Journal of Power Sources 43 (1-3), 135-141), have better electrochemical stability but lower ionic conductivity (~$10^{-3}$ S/cm). Only Li$_{2.9}$PO$_{3.3}$N$_{0.46}$ (LiPON) is used commercially as a solid electrolyte in microbatteries (Bates et al., 1992, Solid State Ionics 53, 647-654; Bates et al., 1993, Journal of Power Sources 43 (1-3), 103-110). The highest RT ionic conductivities for lithium superionic conductors have recently been reported for Li$_{10}$GeP$_2$S$_{12}$ (12 mS/cm). Substitution of Sn for Ge also forms a superionic crystal, Li$_{10}$SnP$_2$S$_{12}$ (7 mS/cm), and both materials are metastable (Bron et al., 2013, J Am Chem Soc 135 (42), 15694-15697; Mo et al., 2012, Chemistry of Materials 24 (1), 15-17). However, these electrolytes are brittle, and they have poor adhesion to electrodes due to changes in volume during successive charge/discharge cycles.

Soft-solid electrolytes exhibit desirable flexibility, but have lower conductivity than ceramic/glass/inorganic conductors (e.g., conductivities in the range of $10^{-7}$ to $10^{-5}$ S/cm). Examples of soft-solid electrolytes include polyethylene oxide (PEO) (Abitelli et al., 2010, Electrochimica Acta 55, 5478-5484), PEO/composite blends (Croce et al., 1998, Nature 394, 456-458; Croce et al., 1999, J of Physical Chemistry B 103, 10632-10638; Stephan et al., 2009, J of Physical Chemistry B 113, 1963-1971; Zhang et al., 2010, Electrochimica Acta 55, 5966-5974; Zhang et al., 2011, Materials Chemistry and Physics 121, 511-518; Zhan et al., 2011, J of Applied Electrochemistry 40, 1475-1481; Uvarov, 2011, J of Solid State Electrochemistry 15, 367-389), PEO copolymers/blends (Tsuchida et al., 1988, Macromolecules 21, 96-100; Ryu et al., 2005, J of the Electrochemical Society 152, A158-A163; Park et al., 2004, Electrochimica Acta 50, 375-378), molecular or ionic plastic crystals (Timmermans, 1961, J of Physics and Chemistry of Solids 18, 1-8; Sherwood, 1979, The Plastically Crystalline State: Orientationally Disordered Crystals, Wiley, Chichester, UK; MacFarlane and Forsyth, 2001, Advanced Materials 13, 957-966; Pringle et al., 2010, J of Materials Chemistry 20, 2056-2062; Cooper and Angell, 1986, Solid State Ionics 18-9, 570-576; Yoshizawa-Fujita et al., 2007, Electrochemistry Communications 9, 1202-1205.), and low molecular weight glymes (Henderson et al., 2003, Chemistry of Materials 15, 4679-4684; Henderson et al., 2003, Chemistry of Materials 15, 4685-4690; Seneviratne et al., 2004, J of Physical Chemistry B 108, 8124-8128; Andreev et al., 2005, Chemistry of Materials 17, 767-772; Henderson et al., 2005, Chemistry of Materials 17, 2284-2289; Henderson, 2006, J of Physical Chemistry B 110, 13177-13183; Zhang et al., 2007, Angewandte Chemie-International Edition 46, 2848-2850; Zhang et al., 2007, J of the American Chemical Society 129, 8700-8701). Another example of a soft-solid electrolytic material is NAFION™ polymer, which has a hydrophobic perfluorinated matrix that contains anion-coated (typically —SO$^{3-}$) percolating clusters, and channels through which oppositely charged ions can migrate (Mauritz and Moore, 2004, Chemical Reviews 104, 4535-4586).

For PEO systems, conductivity has been shown to occur primarily through the amorphous phase, where ion migration is coupled to slow backbone segmental motions (Borodin and Smith, 2006, Macromolecules 39, 1620-1629), so that decreases in crystallinity (Abitelli et al., 2010, Electrochimica Acta 55, 5478-5484; Stephan et al., 2009, J of Physical Chemistry B 113, 1963-1971; Zhang et al., 2010, Electrochimica Acta 55, 5966-5974; Zhan et al., 2011, J of Applied Electrochemistry 40, 1475-1481), and alignment of polymer chains (Bruce, 1996, Philosophical Transactions of the Royal Society a-Mathematical Physical and Engineering Sciences 354, 1577-1593; Andreev and Bruce, 2000, Electrochimica Acta 45, 1417-1423), increase conductivity.

Other approaches to improve ionic conductivities in soft-solid electrolytes are based on the observation that molecular organization rather than disordered structures foster ion mobility. In particular, this is true for materials in which there are alternative, low activation energy pathways for ion migration, such as along and between organized, aligned polymer or liquid crystalline polymer chains (Andreev and Bruce, 2000, Electrochimica Acta 45, 1417-1423; Golodnitsky and Peled, 2000, Electrochimica Acta 45, 1431-1436; Dias et al., 1998, Electrochimica Acta 43, 1217-1224; Hubbard et al., 1998, Electrochimica Acta 43, 1239-1245; Imrie et al., 1999, Advanced Materials 11, 832-834; Yoshio et al., 2004, J of the American Chemical Society 126, 994-995; Kishimoto et al., 2003, J of the American Chemical Society 125, 3196-3197; Yoshio, 2006, J of the American Chemical Society 128, 5570-5577; Shimura et al., 2008, J of the American Chemical Society 130, 1759-1765; Ichikawa, 2011, J of the American Chemical Society 133, 2163-2169); along polymeric/inorganic nanoparticle interfaces, possibly due to weakening of the ether O—Li$^+$ bond (Shen, 2009, Electrochimica Acta 54, 3490-3494; Chen-Yang et al., 2008, J of Power Sources 182, 340-348; Marcinek et al., 2000, J of Physical Chemistry B 104, 11088-11093; Borodin et al., 2003, Macromolecules 36, 7873-7883); and along ion channels in low molecular weight glymes and trilithium compounds (Gadjourova et al., 2001, Nature 412, 520-523; MacGlashan et al., 1999, Nature 398, 792-794; Gadjourova et al., 2001, Chemistry of Materials 13, 1282-1285; Stoeva et al., 2003, J of the American Chemical Society 125, 4619-4626; Staunton et al., 2005, J of the American Chemical Society 127, 12176-12177; Zhang et al., 2007, J of the American Chemical Society 129, 8700-8701; Zhang et al., 2008, Chemistry of Materials 20, 4039-4044; Moriya et al., 2012, Chemistry-A European J 18, 15305-15309). Decreased interactions between mobile cations such as Li$^{30}$ and their associated anions and/or solvating matrix, such as in microphase separated solid polymer electrolytes (SPEs) have also been shown to increase cation mobility and conductivity (Ryu et al., 2005, J of the Electrochemical Society 152, A158-A163). For the design of soft solid electrolytes with higher conductivities, crystalline solids in which channel walls have low affinity for the enclosed ions are desired.

Key problems that remain for the use of solid electrolytes in all solid-state Li batteries, aside from the general concerns of stability windows and compatibility with solvents when used in air or liquid flow-through cathodes, are improvements in room temperature ionic conductivities, increased charge/discharge rates, high lithium ion transference numbers to avoid polarization effects, and the maintenance of good electrode/electrolyte contact during the volume changes that occur in the electrodes during repeated charge/discharge cycles (Doyle et al., 1994, Electrochimica Acta 39, (13), 2073-81; Thomas et al., 2000, J of Power Sources 89, (2), 132-138; Gadjourova et al., 2001, Nature 412, (6846), 520-523). The engineering of solid-state organic materials with specific ion conduction pathways that can enhance ion migration offers promise as a means to achieve higher solid-state ionic conductivities, while soft, more malleable organics may better adhere to electrodes. However, there has been only limited progress in this area.

In addition, materials research for sodium ion batteries, which is highly desirable because sodium is more abundant than lithium, has focused on the cathodes (Lu et al., 2010, J of Power Sources 195, (9), 2431-2442; Lu et al., 2010, JOM 62, (9), 31-36; Kim et al., 2012, Advanced Energy Materials 2, (7), 710-721; Ellis and Nazar, 2012, Current Opinion in Solid State & Materials Science 16, (4), 168-177; Palomares et al., 2012, Energy & Environmental Science 2012, 5, (3), 5884-5901). There has been less research on the electrolytes for sodium ion batteries, for which the sodium salts are less soluble than lithium salts in aprotic solvents. Inorganic materials such as NASICON Na+ superionic conductors are the most common solid sodium electrolytes investigated (Fuentes et al., 2001, Solid State Ionics 140, (1-2), 173-179). However, there have also been studies on polyethylene oxide (Ma et al., 1993, J of the Electrochemical Society 140, (10), 2726-2733; Mohan et al., 2007, Soft Materials 5, (1), 33-46; Mohan et al., 2007, J of Polymer Research 14, (4), 283-290; Kumar et al., 2011, Physica B-Condensed Matter 406, (9), 1706-1712) or polyvinyl alcohol-based polymer electrolytes (Bhargav et al., 2007, Ionics 13, (3), 173-178; Bhargav et al., 2007, Ionics 2007, 13, (6), 441-446), as well as polymer gels (Kumar and Hashmi, S. A., 2010, Solid State Ionics 181, (8-10), 416-423; Kumar et al., 2011, Solid State Ionics 202, (1), 45-53; Kumar et al., 2011, Solid State Ionics 201, (1), 73-80). The same considerations and requirements for Na-ion solid electrolytes are necessary as for Li-ion solid electrolytes.

Thus, there is a continuing need in the art for solid state electrolytes, including solid sodium electrolytes, for electrochemical devices. The present invention addresses this continuing need in the art.

SUMMARY OF INVENTION

The present invention relates to soft-solid electrolyte compositions and methods for producing such compositions. In one embodiment, the composition of the present invention is a soft-solid electrolyte composition comprising a co-crystal of an ionic compound and an organic compound. In one embodiment, the co-crystal comprises ion channels.

In one embodiment, the composition of the present invention is a free-standing thin film electrolyte composition comprising any embodiment of the soft-solid electrolyte compositions of the present invention, and a binder. In one embodiment, the binder is polyethylene oxide (PEO). In another embodiment, the binder is polyoctahedral silsesquioxane functionalized with eight polyethylene glycol chains (POSS-PEG$_8$).

In one embodiment, the present invention is a method for making a soft-solid electrolyte composition comprising the steps of: dissolving an ionic compound in an organic compound to form a solution, and adding a precipitating agent to the solution, wherein a co-crystal of the ionic compound and the organic compound is precipitated from the solution. In another embodiment, the method of the present invention is a method for making a soft-solid electrolyte composition comprising the steps of: dissolving an ionic compound in an organic compound to form a solution, and reducing the temperature of the solution, wherein a co-crystal of the ionic compound and the organic compound is precipitated from the solution upon cooling. In yet another embodiment, the method is method for making a soft-solid electrolyte composition comprising the steps of: mixing an ionic compound with an organic compound to form a mixture, heating the mixture to form a solution of the ionic compound in the organic compound; and cooling the solution, wherein a co-crystal of the ionic compound and the organic compound is precipitated from the solution upon cooling.

In one embodiment, the method of the present invention can further comprise the step of isolating the co-crystal. In another embodiment, the method can further comprise the step of protecting the co-crystal from air. In another embodiment, the method can further comprise the step of protecting the co-crystal from water. In one embodiment, the organic compound is polymerizable. In one embodiment, the method of further comprises the step of polymerizing at least a portion of co-crystal. In one embodiment, the precipitating agent is diethyl ether ($Et_2O$). In various embodiments, the co-crystal produced by the method of the present invention comprises ion channels.

In one embodiment, the method of the present invention is a method for making a free-standing thin film electrolyte composition comprising the steps of: mixing a binder with a solvent to form a solution, adding an embodiment of the soft-solid electrolyte composition of the present invention to the solution, and removing the solvent to form a free-standing thin film. In one embodiment, the solvent is diethyl ether. In one embodiment, the binder is PEO or POSS-$PEG_8$.

In one embodiment, the composition of the present invention has a conductivity of at least about $1\times10^{-5}$ S/cm. In various embodiments, the ionic compound of the present invention is a lithium salt. In one embodiment, the lithium salt is lithium chloride. In various embodiments, the ionic compound is a sodium salt. In one embodiment, the sodium salt is sodium perchlorate. In another embodiment, the sodium salt is sodium hexafluorophosphate.

In various embodiments, the organic compound of the present invention is a soft Lewis donor. In one embodiment, the organic compound is an organic solvent. In one embodiment, the organic solvent is N,N-dimethylformamide (DMF). In another embodiment, the organic solvent is pyridine. In some embodiments, the organic compound is a carbonyl compound. In one embodiment, the carbonyl compound is selected from the group consisting of benzophenone, acetophenone, phenylbenzoate. In another embodiment, the organic compound is a pyridyl derivative selected from the group consisting of pyridine and isoquinoline. In some embodiments, the organic compound is an aromatic hydrocarbon. In one embodiment, the aromatic hydrocarbon is selected from the group consisting of diphenylmethane (DPM), triphenylmethane, bibenzyl, biphenyl, and naphthalene.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIGS. 1A and 1B, is a set of crystal packing diagrams of N,N-Dimethylformamide (DMF):LiCl (FIG. 1A) and Pyridine (py):LiCl (FIG. 1B) viewed along the α axis. Channels of $Li^+$ and $Cl^-$ ions are apparent in both structures.

FIG. 3, comprising

FIGS. 6A and 6B, is a set of thermal ellipsoid plots of DMF:LiCl (FIG. 6A) and Py:LiCl (FIG. 6B), illustrating interactions of the $Li_2Cl_2$ rhomb with symmetrically equivalent neighboring rhombs and solvent molecules. Ellipsoids are set at 50% probability level and hydrogen atoms are shown as open circles.

FIG. 20, comprising

DETAILED DESCRIPTION

Figure 1:
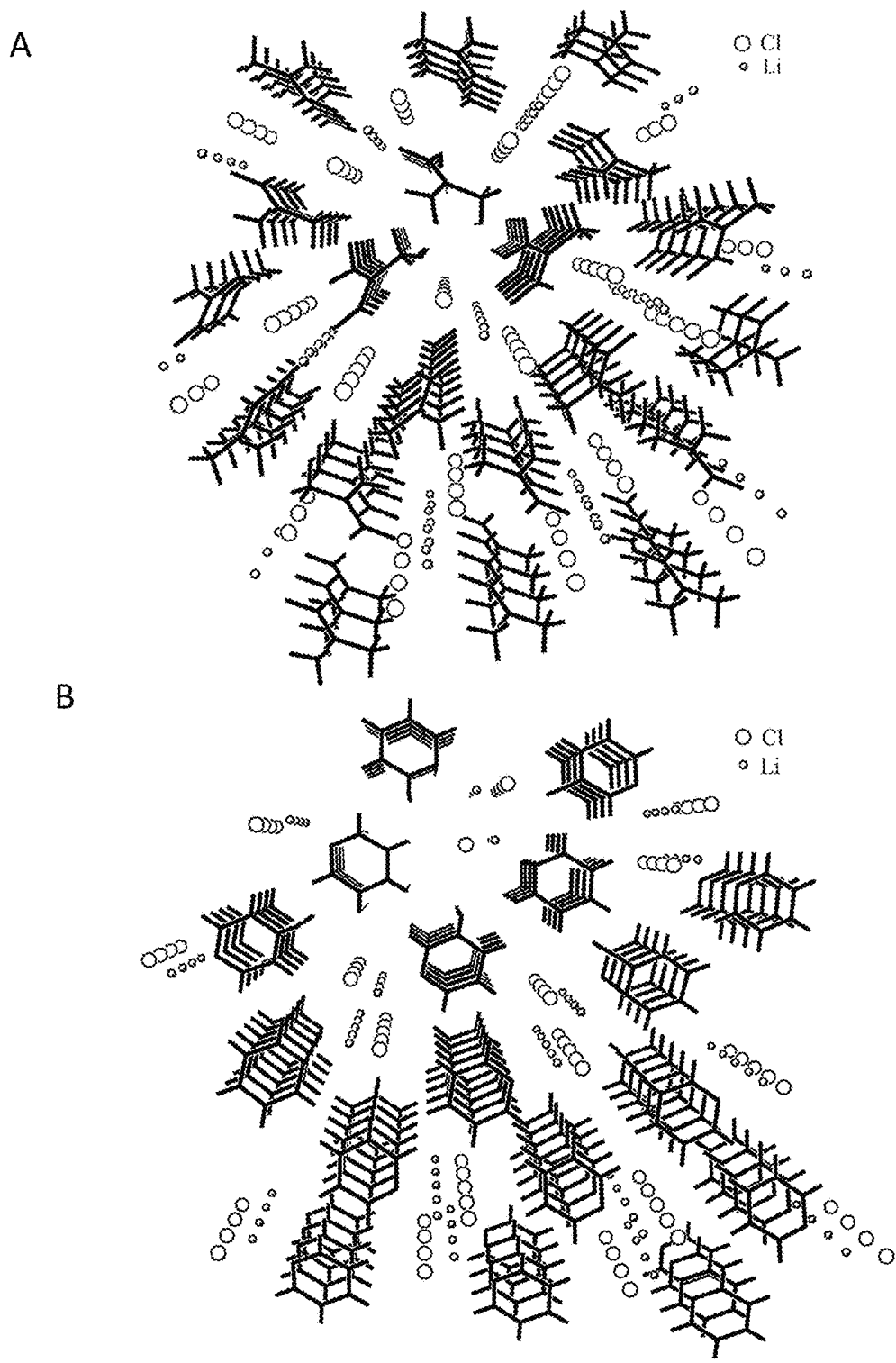
FIG. 1, comprising

It is to be understood that the figures and descriptions of the present invention have been simplified to illustrate elements that are relevant for a clear understanding of the present invention, while eliminating, for the purpose of clarity, many other elements found in the art related to organic-ionic compositions, battery technology, electrolytes useful for batteries or other electrochemical devices, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Description

The present invention relates to compositions comprising ionic compounds surrounded by organic matrices, and methods for producing such compositions. The compositions contain distinct low-affinity ion channels, and are generally solids at room temperature. In one embodiment, the compositions are soft-solid electrolytes, comprising ions such as lithium or sodium, which can be used in batteries. In another embodiment, the compositions can comprise ions other than lithium or sodium, and can be used for non-battery technologies such as water purification, fuel cells, and catalytic devices. Notably, the compositions of the present invention can be prepared using inexpensive organic solvents that are commonly used in a variety of industries. Described herein is the first demonstration of the successful formation of a co-crystal of an ionic compound and an organic compound having ion channels.

The compositions and methods of the present invention are based on the understanding that ionic mobility in crystalline solid electrolytes is generally hindered by strong ionic interactions of the salt with the surrounding matrix, i.e., ion migration in solids is associated with high enthalpy. However, ionic mobility in solid electrolytes can be enhanced by producing compositions with weaker dipole or even non-polar interactions between the salt and the surrounding matrix. Therefore, organic/salt crystals having ion channels with weak interactions between the salt and surrounding organic phase is desirable. Accordingly, the compositions of the present invention are made from organic compounds that are soft Lewis donors and that interact relatively poorly with hard ions, based on the Pearson Hard-Soft Acid Base concept (HSAB). Accordingly, the compositions of the present invention are generally crystalline, soft solid electrolytes for ion conduction with low affinity of the ions for the surrounding matrix.

In various embodiments, the compositions of the present invention are co-crystals of an organic compound with a salt. The organic compound forms matrices with channel structures, wherein the organic matrices interact relatively poorly with the salt, thus allowing for excellent ion mobility through the channel structures. The resulting compositions have relatively high ionic conductivities, for example conductivities greater than $10^{-5}$ S/cm. Further, the conductivity of the compositions of the present invention is nearly temperature independent over a very wide range, indicative of a negligible activation barrier for ion migration, i.e., the compositions exhibit barrierless ion conduction. In addition, the electrolyte compositions of the present invention exhibit good conductivities at very low temperatures (e.g., at -210° C. or below), making them useful in a variety of low temperature applications.

Compositions

The present invention relates to compositions comprising a co-crystal of salt, i.e., an ionic compound, and an organic compound. The crystals are generally soft-solids, and have ion channels of the salt contained within a matrix formed by the organic compound.

The compositions of the present invention are based on the understanding that when organic compounds are co-crystallized with ionic compounds using the methods of the present invention, the additional lattice energy component arising from the ion-matrix and ion-ion attractive forces results in the formation of soft solids with the high crystallinity of an inorganic electrolyte matrix, but the softness and flexibility of a polymer electrolyte matrix.

In one embodiment, the ionic compound of the compositions of the present invention can be a lithium or sodium salt (i.e., LiX or NaX, wherein X=anion). In various embodiments, the anion of the salt can be any species as would be understood by a person skilled in the art, including, but not limited to: chloride, bromide, iodide, tetrafluoroborate, hexafluorophosphate, perchlorate, tetraphenylborate, tetrakis(pentafluorophenyl)borate, $[B[3,5\text{-}(CF_3)_2C_6H_3]_4$ or $[BAr^F_4]^-$ ("barf") anion, anions in the classes of organic carboxylates (e.g., acetate, benzoate), and organic sulfonates (e.g., $PhSO_3^-$). In another embodiment, the salt can be any type of salt other than a lithium or sodium salt that readily forms co-crystals using the methods of the present invention, for example, but not limited to, potassium salts, magnesium salts, or calcium salts. In yet another embodiment, the salt can comprise more than one type of salt, i.e., the composition can comprise a mixture of different salts.

In various embodiments, the composition of the present invention comprises an organic compound that can form a co-crystal with the salts described herein. In various embodiments, the organic compounds useful in making the compositions of the present invention are soft Lewis donors that interact relatively poorly with hard ions such as $Li^+$. In one embodiment, the organic compound is an organic solvent, for example N,N-dimethylformamide (DMF) or pyridine (Py). Such organic solvents are typically liquids at room temperature. However, the composition of the present invention can comprise one or more organic compounds that are not generally referred to as solvents, but which are soft Lewis donors, such as arenes (e.g., diphenylmethane (DPM)); thiols/sulfides (e.g., thioanisole); carbonyl compounds including ketones, esters, amides, and aldehydes (e.g. benzophenone); nitriles (e.g., benzonitrile); phosphines (e.g., triphenylphosphine); or any other substance whose Lewis acid donor capability is described as "soft" by the HSAB concept. This may include substances and/or compounds that are not liquids at room temperature. Other examples of organic solvents or compounds useful in the compositions of the present invention include, but are not limited to: carbonyl compounds, for example benzophenone, acetophenone, phenylbenzoate, and pyridyl derivatives, for example, pyridine and isoquinoline, and aromatic hydrocarbons, for example triphenylmethane, bibenzyl, biphenyl, and naphthalene. However, the composition can comprise any other organic solvent or compound not specifically listed herein, as would be understood by a person skilled in the art, including any derivatives, for example methylated derivatives, of the organic compounds listed herein.

Further, the compositions of the present invention comprise structures that are optimal for ion conduction. Specifically, the compositions exhibit structures of organic matrices having channels suitable for ion conduction. In one embodiment, the present invention relates to the formation of LiX- and NaX-organic crystals that form ion channels in which LiX or NaX resides in organic channels, and wherein the matrix walls have weakly polar, "soft" (HSAB), or preferably non-polar interactions with the LiX or NaX. In one embodiment, the ion channels can be 1-, and 2-D ion channels. In one embodiment, the crystals can contain higher dimensionality channels, i.e., 3-D channels or channels in 2-D planes with pathways between the planes, since point defects in 1-D crystals can limit ion migration.

Figure 2:
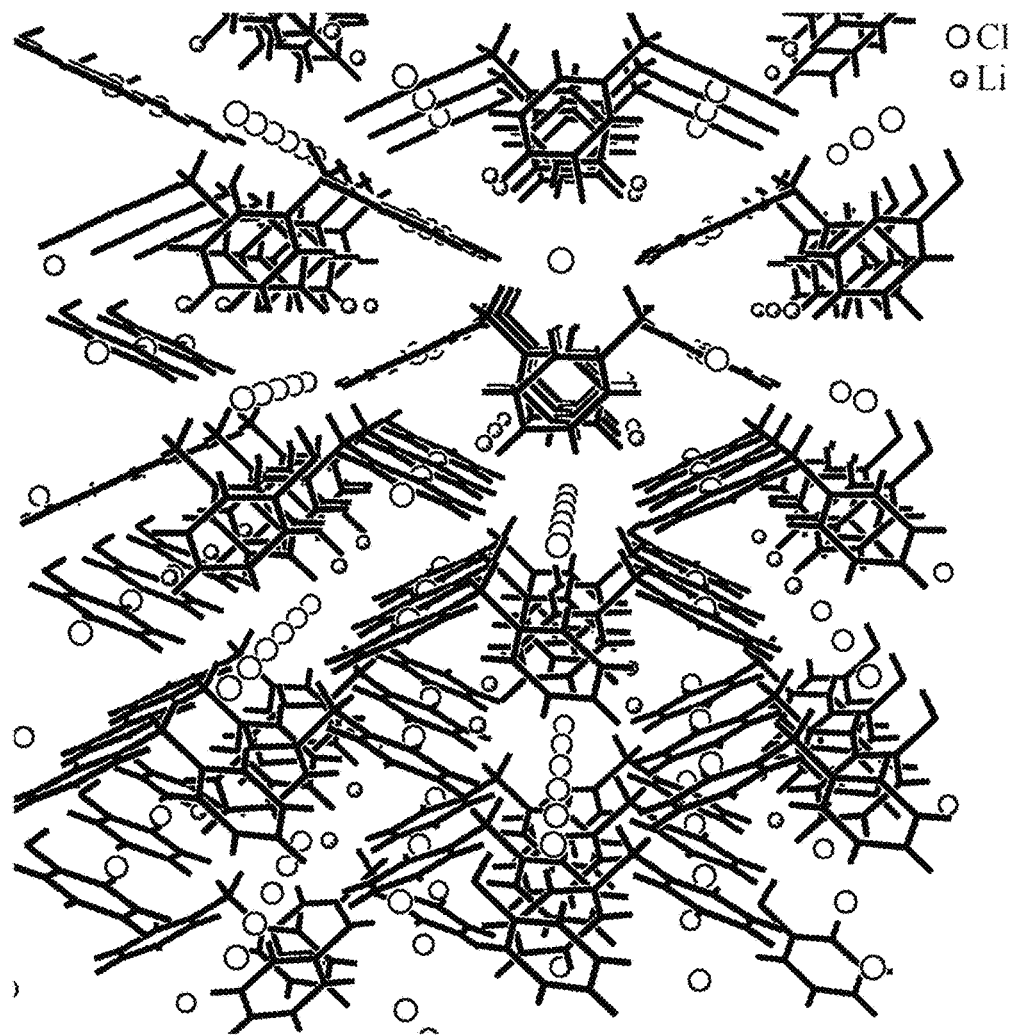
FIG. 2 is a diagram of the crystal packing of Diphenylmethyl (DPM):LiCl cocrystal showing parallel $Li^+$ and $Cl^-$ ion channels with only weak interactions with C—H bonds of diphenylmethane.
Figures 3A, 3B:
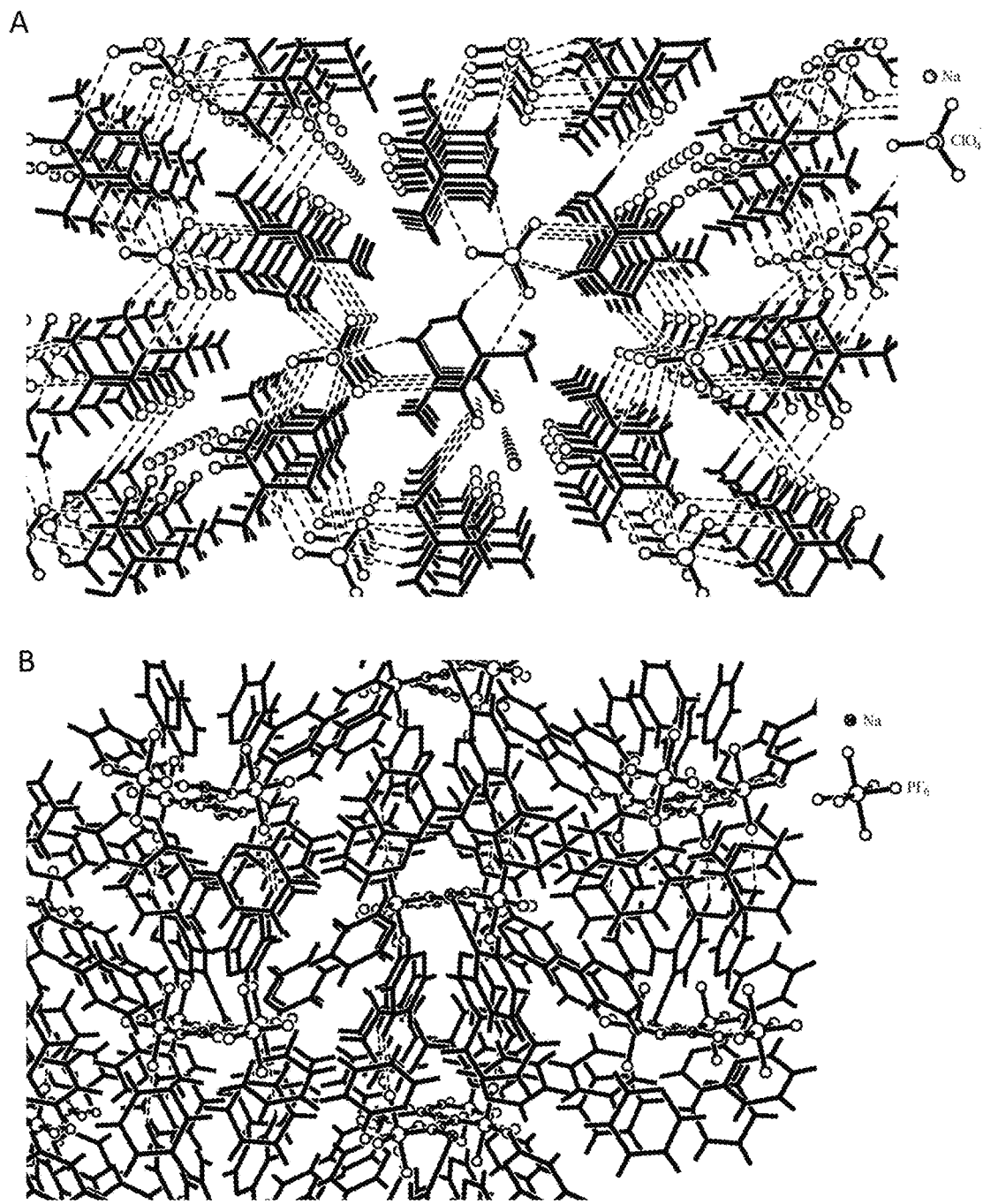
FIGS. 3A through 3F, is a set of crystal packing diagrams and X-ray crystallographic structures of exemplary embodiments of the composition of the present invention comprising $Na^+$ salts.
Figures 3C, 3D:
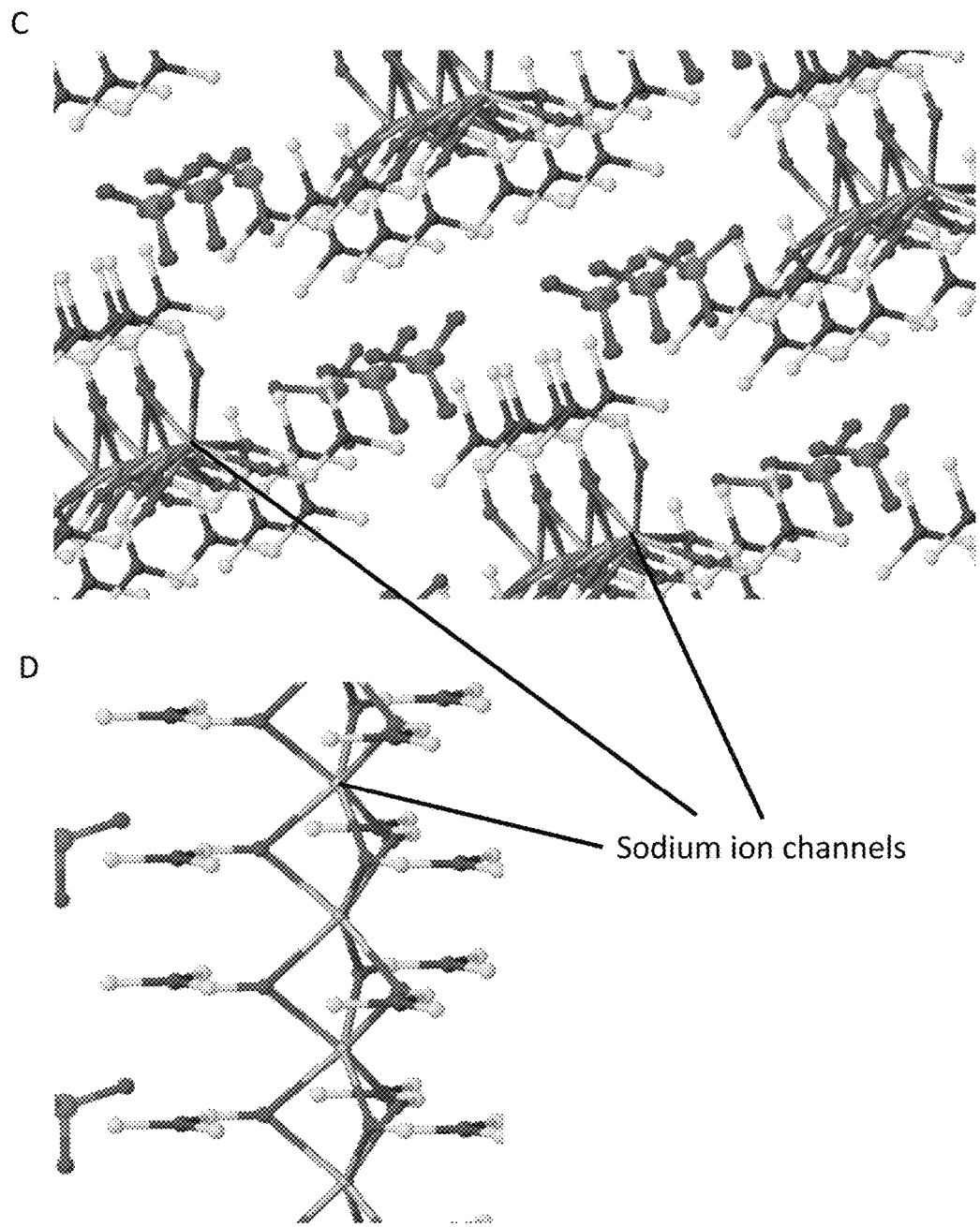
Figures 3E, 3F:
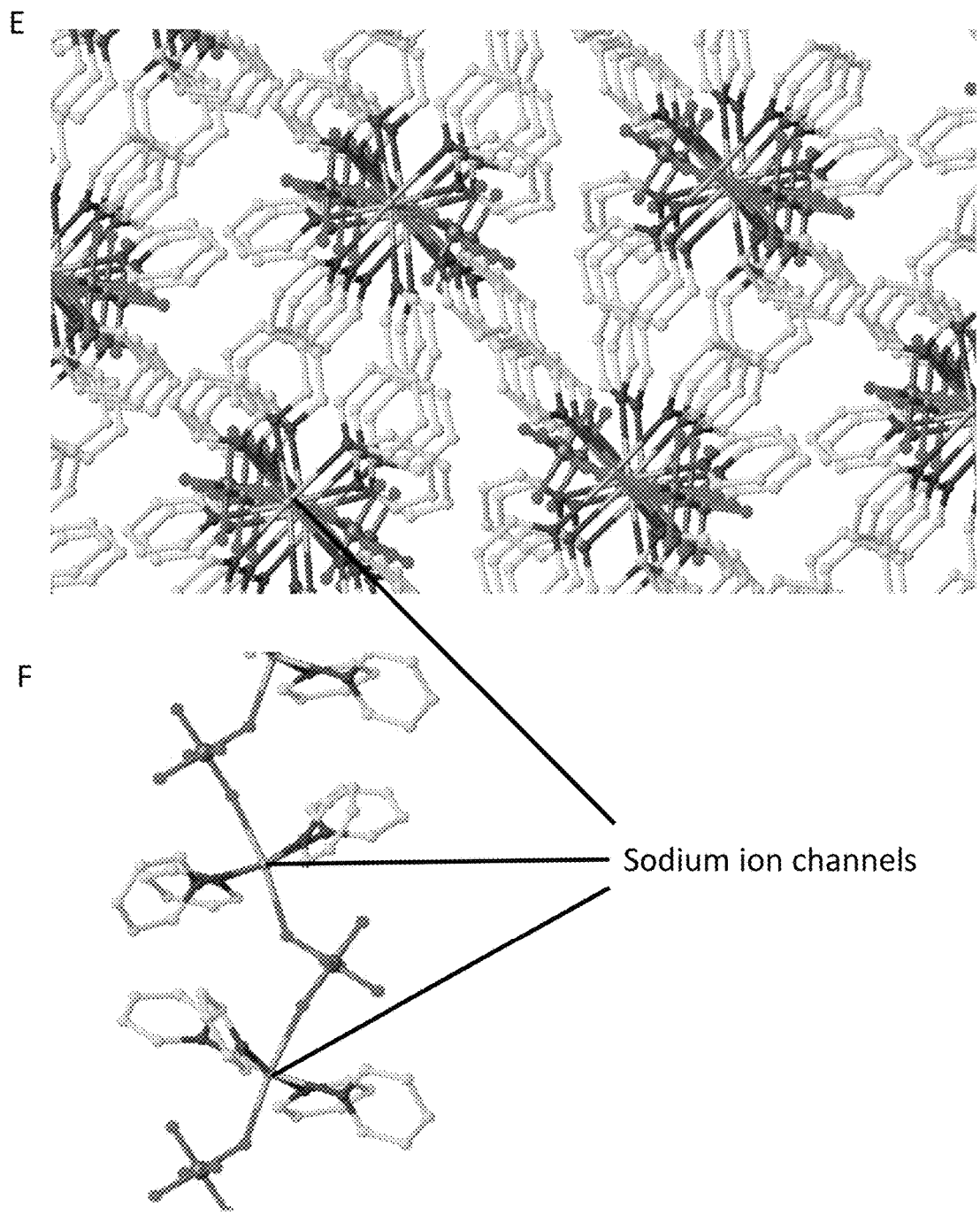

Exemplary embodiments of the composition of the present invention include co-crystals of lithium chloride with DMF (DMF-LiCl), pyridine (Py-LiCl), and diphenylmethane (DPM-LiCl). Crystal packing diagrams of these three exemplary embodiments are shown in FIG. 1A (DMF-LiCl), FIG. 1B (Py-LiCl), and FIG. 2 (DPM-LiCl). Further, crystal packing diagrams for exemplary embodiments of co-crystals of sodium salts are shown in FIG. 3A ($(DMF)_3$-sodium perchlorate, i.e., three DMF molecules per $NaClO_4$ salt) and FIG. 3B ($Py_4$-sodium hexafluorophosphate, i.e., four pyridine molecules per $NaPF_6$ salt). When viewed along the α axis of the unit cell in FIGS. 1-3, the linear channels of ions are apparent. FIGS. 3C and 3D show $NaClO_4$ salt as a solid solution in DMF, with sodium ion channels perpendicular to the page (3C) and a single channel parallel to the page (3D). FIGS. 3E and 3F show $NaPF_6$ salt as a solid solution in pyridine, with sodium ion channels perpendicular to the page (3E) and a single channel parallel to the page (3F)

The properties and structure of the compositions of the present invention can be optimized through the selection of the organic compound. In one aspect, the number and type of soft Lewis donors on the organic compound can influence the properties and structure of the resulting cocrystal. In another aspect, the properties and structure of the resulting cocrystal can depend on other features of the organic compound, such as the ability of the organic compound to have π-stacking interactions. Subtle differences in ligands have been previously shown to affect the crystal structure and transport properties of soft crystals (Zhang et al., 2007, J of the American Chemical Society 129, (28), 8700-8701). Accordingly, it is understood that a person skilled in the art could select and/or modify the organic compound of the present invention to optimize the properties of the composition, such as the conductivity, rigidity, and thermal stability of the composition.

For example, as suggested by the reinforcement of π-stacking interactions in the matrices of the pyridine and diphenylmethane LiCl complexes, the use of aryl groups can enhance matrix stability. In one embodiment, the organic compound can combine the solvating ability of methylated amides (i.e., as observed in the DMF-LiCl adduct) with the ability to form stronger π-stacking interactions within the matrix. The soft carbonyl donor of the amide also provides a weak contact to the hard lithium ion to permit easy ion migration. In such an embodiment, the organic compound can be the commercially available N,N-dimethylbenzamide, or an analog or derivative thereof.

Similarly, the use of low-melting benzophenone, acetophenone, and phenylbenzoate represent commercially available low melting solvates that include the strength of π-stacking interactions in arenes. For matrix molecules based on pyridine, isoquinoline represents a low-melting solid analogue of pyridine which permits increased π-stacking opportunities. In addition, hydrocarbons related to diphenylmethane, such as triphenylmethane, dibenzyl, transstilbene, naphthalene, and biphenyl, or analogs or derivatives thereof, can be used to minimize ion-matrix affinity and enhance matrix stability from π-stacking.

In one embodiment, the organic compound of the composition of the present invention can contain vinyl or other olefinic groups which can be polymerized. In such an embodiment, the strength and stability of the soft-solid electrolytes of the present invention can be improved by polymerizing the organic matrix compound after the compound is co-crystallized with the ionic compound. For example, the aromatic hydrocarbon styrene, or a derivative thereof, can be used to make a co-crystal composition with LiCl, and then the co-crystal composition can be polymerized via photonic activation and/or the use of a radical or anionic initiator.

The properties and structure of the compositions of the present invention can also be optimized through the selection of the ionic compound. In one aspect, the cation conductivity can be enhanced by variation of the anion, for example by selecting the anion based on size. Anions are generally larger than cations, and their variation is expected to alter the crystalline structures and channel sizes in ion-matrix cocrystals to a larger degree than cation variation. Wide variations have been observed in the structures and crystallization kinetics of Li glymes with a range of counteranions. The crystallization kinetics of these salts are well-correlated with the ionic association behavior of the different lithium salts in aprotic solvents (Henderson, 2007, Macromolecules 40, (14), 4963-4971). In general, larger anions will move through the matrix less freely due to steric hindrance. However, in some cases, larger anions may move more freely because they have more diffuse charge and may form larger channels than smaller anions. Accordingly, it is understood that a person skilled in the art could select the counteranion of the ionic compound to optimize or modify the properties of the composition of the present invention, depending on a variety of considerations, such as the organic compound being used or the desired operating temperature range of the electrolyte.

In one embodiment, the composition can comprise two or more ionic compounds, i.e., a mixture of different ionic compounds. For example, ionic compounds with the same cation (e.g., Li), but different counteranions, can be used in the composition. Similarly, in one embodiment, the composition can comprise two or more organic compounds, i.e., a mixture of different organic compounds. Accordingly, the properties of the composition of the present invention can be modified or optimized by selecting the type and/or relative amount of the different ionic or organic compounds in such an embodiment.

In some embodiments, the composition of the present invention can exhibit both ionic conduction and electron conduction. For example, the stacking of aromatic rings can create channels for ionic conduction, while the overlap of the pi electron clouds provides a pathway for electron conduction. Such dual-conduction behavior is similar to the charge-transfer salt $Li_{0.6}$ (15-crown-5-ether) $[Ni(dmit)_2]_2 \cdot H_2O$, which exhibits both electron conductivity, via the stacks of the nickel complex (dmit is an organic molecule), and ion conductivity, via the stacks of the crown ethers providing channels for lithium-ion motion (Nakamura et al., 1998, Nature 394 (6689), 159-162).

In various embodiments, the compositions of the present invention can comprise a self-standing thin film via the incorporation of ion-conductive materials at low weight percent (e.g., 10%). For example, the ion-conductive material can be polyethylene oxide (PEO), or oligomeric polyoctahedral silsesquioxane (POSS) functionalized with eight polyethylene glycol chains ($POSS-PEG_8$).

Methods

The composition of the present invention can be synthesized as described below. The construction of these compositions proceeds by simple crystal growth of salts interspersed with organic matrix molecules. The methods of the present invention can be performed using commonly available organic compounds that are suitable for use as the electrolyte matrix for salts such as LiX and NaX. The resulting compositions are generally soft, flexible solid materials with excellent ion conduction.

Figure 4:
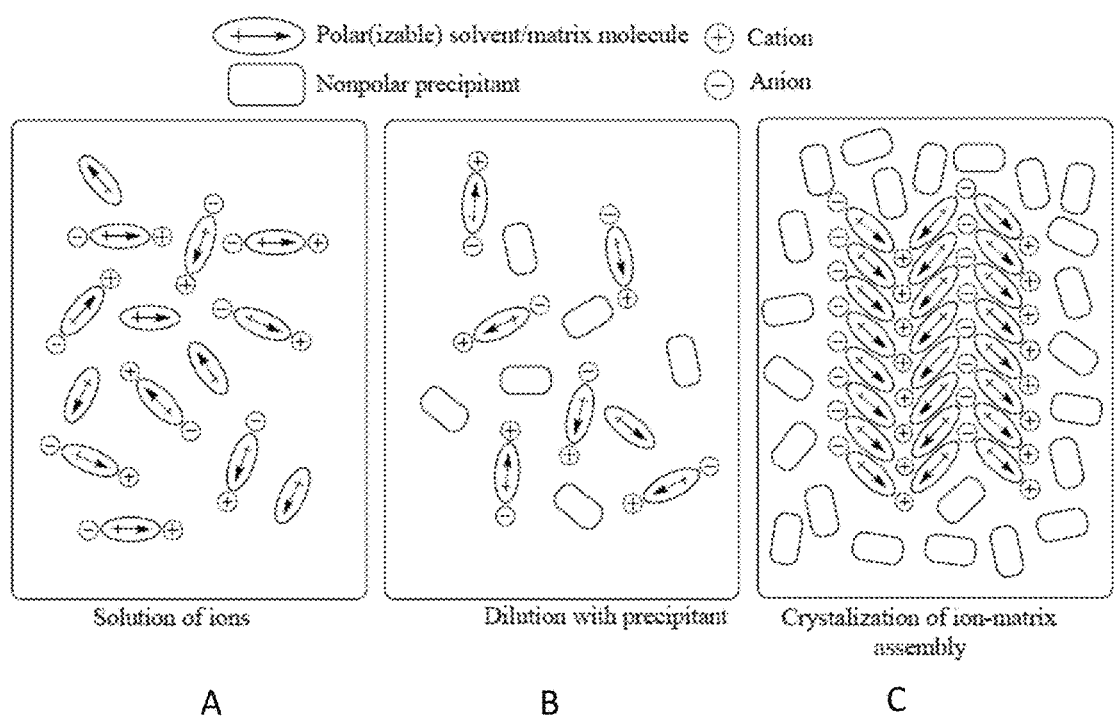
FIG. 4 is a diagram illustrating the ion-matrix assembly method of the present invention.

Referring to FIG. 4, a schematic diagram of an exemplary embodiment of the method for making the compositions of the present invention is shown. First, in FIG. 4A, an ionic compound, such as LiCl, is dissolved in a minimal amount of the organic compound (i.e., solvent), for example DMF or pyridine. In the presence of a polar (or polarizable) solvent, ionic compounds are dissolved due to the replacement of ionic bonds with ion-dipole interactions, resulting in a solution in which ions are interspersed with the matrix molecules. Next, in FIG. 4B, a precipitant or precipitating agent, for example diethyl ether ($Et_2O$), is added to the solution of ions and matrix molecules. Upon slow introduction of the precipitating agent, the polar ion-molecule assemblies arrange into an organized lattice to avoid molecular interactions between the polar and non-polar phases (FIG. 4C), resulting in the precipitation of highly pure co-crystals of the ionic compound and the solvent/matrix molecule. The result is an ion-molecule matrix with organized and well-separated ions, and a high probability of ion channels. The relatively pure co-crystals can then be isolated from the precipitant and/or any unreacted starting materials.

Accordingly, in one embodiment, the method of the present invention comprises the steps of dissolving an ionic compound in an organic compound to form a solution, and then adding a precipitating agent to the solution, wherein a co-crystal comprising the ionic compound and organic compound is formed. In such an embodiment, the method may further comprise the step of removing the precipitating agent, for example by applying vacuum to the composition if the precipitating agent is sufficiently volatile. In various embodiments, the precipitating agent can be any compound as would be understood by a person skilled in the art, and is generally a relatively volatile non-polar solvent that is miscible with the organic compound of the present invention.

The compositions of the present invention can also be synthesized without the use of a precipitating agent. In one embodiment, the ionic compound can be dissolved in the organic compound, then the co-crystal of the ionic compound and organic compound can be formed by lowering the temperature of the solution. In another embodiment, the co-crystal of the ionic compound and organic compound can form spontaneously, without the need for reducing the temperature of the solution.

In various embodiments, the organic compound may need to be heated to facilitate dissolution of the ionic compound, or to melt the organic compound, for example when the organic compound is a solid at room temperature. Therefore, the method of the present invention may include the step of heating the organic compound, the ionic compound, or the mixture of the organic compound and ionic compound.

The crystals produced by the methods of the present invention can be very hygroscopic due to the strongly Lewis acidic ions (e.g., $Li^+$). Accordingly, the crystallized compositions of the present invention can quickly absorb water to form a biphasic liquid when exposed to air. However, when the crystals are stored in a relatively airtight vessel at a relatively cold temperature, the crystals are stable indefinitely. Thus, the method of the present invention may further comprise steps of protecting the crystals from air or water, for example by transferring the co-crystals to a drybox or airtight vessel, and/or storing the crystals at a suitable temperature, in order to avoid degradation of the crystals.

Figure 5:
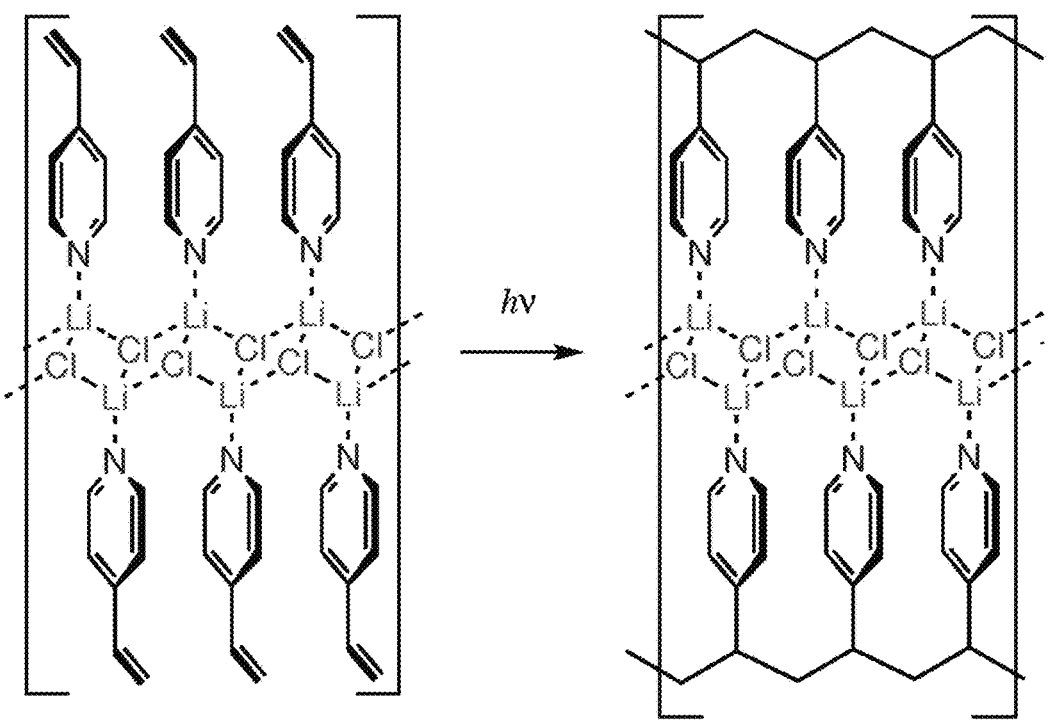
FIG. 5 is an illustration of the reaction scheme for the polymerization of a soft solid co-crystalline matrix of 4-vinylpyridine and LiCl by ultraviolet-induced radical polymerization of the olefin functionality.

In addition, the co-crystals synthesized using the methods described herein can be treated or modified after being formed. In one embodiment, the portion of the co-crystal comprising the organic compound can be polymerized to improve the stability or other characteristics of the composition. Accordingly, the methods of the present invention can further comprise the step of polymerizing at least a portion of the compositions, for example by exposing the co-crystals with ultraviolet light and/or an initiating agent. An example of the polymerization of the organic compound of the present invention is shown in FIG. 5. In this example, a soft solid co-crystalline matrix of 4-vinylpyridine and LiCl is polymerized via ultraviolet radiation.

The present invention further includes a method for preparing the co-crystals of the present invention as self-standing thin films. In this method, the crystals are incorporated into an ionic-conductive binder composition, such as PEO or POSS-PEG$_8$. In one embodiment, the method includes the steps of dissolving the binder (e.g., PEO or POSS-PEG$_8$) in a solvent, wherein the solvent is not suitable for dissolving the co-crystal composition; mixing the co-crystal composition with the binder/solvent solution; then evaporating the solvent to form a thin film comprising the binder and co-crystal composition.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1

DMF-LiCl and Py-LiCl Cocrystals

Crystalline soft-solid electrolytes were prepared from common, inexpensive laboratory solvents. The preparation of solid solutions of Li$^+$ and Cl$^-$ in crystalline organic matrices was achieved by precipitation of the co-crystals from a LiCl solution. LiCl(s) was dissolved in a minimum of solvent, either DMF or pyridine.

Addition of diethyl ether precipitant resulted in precipitation of pure, white co-crystals of LiCl and the respective solvent. This solvent combination is ideal for isolation of pure material since the solvents DMF and pyridine are both soluble (miscible) in Et$_2$O, while LiCl is insoluble in Et$_2$O. Presumably the Li+ and Cl− ions exist as solvent adducts in solution, and thus, when Et$_2$O is added, LiCl precipitates not as a pure salt, but as an adduct with its solvent, resulting in a solid Li+ and Cl− solution in a crystalline, solid solvent matrix The resulting organic-ionic co-crystalline lattices are solid materials with reasonably good solid state ion conductivities, particularly at low temperatures, due to the presence of parallel channels of ions through the crystal. The mismatch of soft donor ligand sites (carbonyl oxygen in DMF or aromatic nitrogen in pyridine) with the hard ions, leads to barrierless, i.e., temperature independent ion migration. The use of two common soft-base donor solvents to achieve similar results suggests the generality of this approach for the formation of soft-solid electrolyte materials.

All operations were carried out under a dry N$_2$ or argon atmosphere using Schlenk and glove box techniques for the rigorous exclusion of water. Anhydrous LiCl was used as purchased from chemical suppliers (either Aldrich or Strem). DMF and pyridine were distilled under a N$_2$ atmosphere using CaH$_2$ as a scavenger. Et$_2$O was distilled using sodium benzophenone ketyl as a scavenger. All solvents were stored in the glovebox over activated 3 Å molecular sieves for 12 h prior to use. Single crystal and powder diffraction was carried out on a Bruker APEX II DUO diffractometer. Mo Kα radiation was used for single-crystal structural determination, while Cu Kα radiation was used for powder diffraction studies. Ionic conductivities were measured by AC impedance spectroscopy using a Gamry Interface 1000 potentiostat/galvanostat/ZRA in the frequency range 10-100 kHz. Temperature dependent conductivities from −78 to 20° C. were obtained using stainless steel blocking electrodes, which was temperature controlled in a gas chromatography oven. At each temperature the cell was equilibrated for 30 min. and conductivity (σ) measurements on the cooling and heating cycles were the same. The reported conductivities were from fits of the slanted line impedance data to an equivalent circuit to extract the bulk resistance (R). The specific ionic conductivity (σ) was obtained from σ=t/AR, where R is the bulk resistance (Ω), A=area (1 cm$^2$) of the stainless steel electrodes, and t=thickness of the electrolyte material. Thermogravimetric analysis (TGA) was obtained on a TA Instruments Hi-Res TGA 2950 at a ramp rate of 10° C./min and under N2 purge gas. Fourier transform infrared spectroscopy (FTIR) data were obtained on a Nicolet 580 research FTIR with a Specac Golden Gate ATR accessory (diamond lens) equipped with an MCT detector with 100 scans and 4 cm-resolution.

Synthesis

Single crystals were obtained by the dissolution of anhydrous LiCl in either DMF or pyridine. The crystals were grown by vapor diffusion of Et$_2$O into this solution at room temperature in a double-vial apparatus.

Bulk powder samples of DMF:LiCl and py:LiCl were prepared using identical protocols. LiCl, 0.2-0.5 g (5.2 mmol) was dissolved in DMF or pyridine (2 mL solvent per 0.1 g LiCl) with stirring until dissolved. Dissolution was slow, typically taking about 20 minutes. The solution was diluted slowly with diethyl ether (1:4 by volume) and the solution mixed for about 5 minutes, resulting in a white precipitate. The mixture was filtered, and the solid was washed several times with diethyl ether, and dried under vacuum. The compound was stored in a tape-sealed scintillation vial in the glovebox freezer. Yields based on LiCl: DMF:LiCl, 87%. py:LiCl, 84%. m.p. DMF:LiCl 70° C. (decomposes), py:LiCl 65° C. (decomposes).

Figure 6:
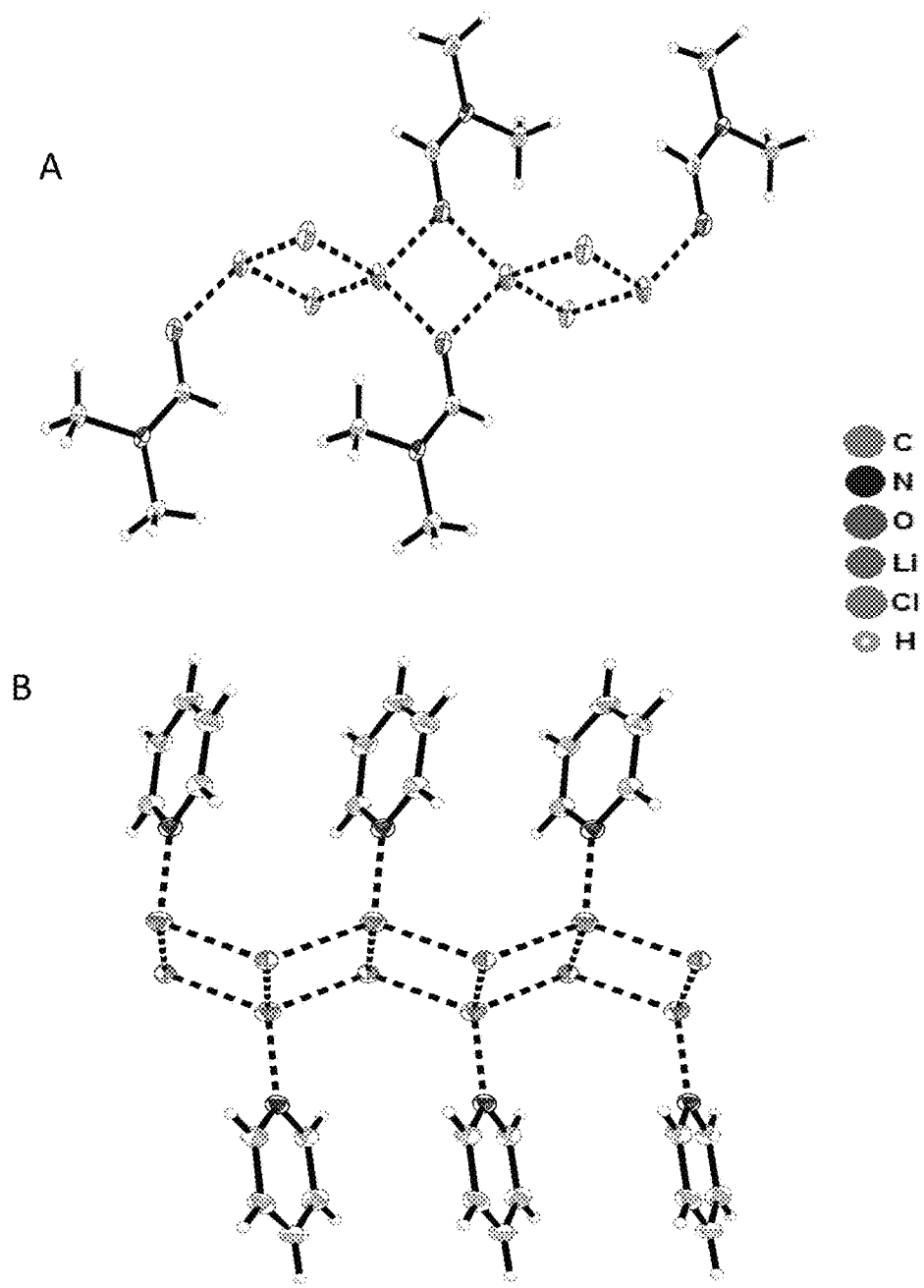
FIG. 6, comprising
Figure 7:
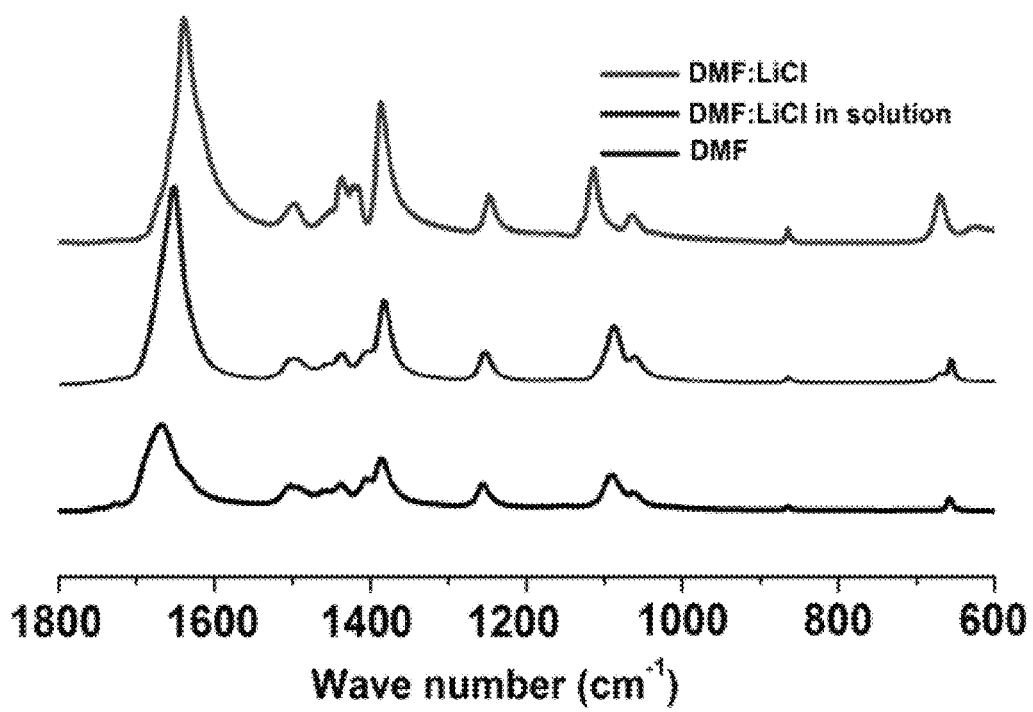
FIG. 7 is an AT-IR spectra of DMF (bottom curve), DMF dissolved in LiCl (middle curve) and DMF:LiCl complex (top curve), showing red shift of C═O band near 1690 $cm^{-1}$ in the presence of LiCl.

Results Single-crystal X-ray diffraction identifies the solids as 1:1 adducts of LiCl with a molecule of the respective solvent. Referring to FIG. 6, the structure shows the formation of 1-D ionically bonded Li$_2$Cl$_2$ rhombs interacting with the lattice through weak Lewis acid/base adducts between the lithium atoms and soft Lewis donors of the DMF and pyridine ligands (O and N respectively). Referring to FIG. 7, the red-shifted C=O stretch (1640 cm$^{-1}$) in the solid state AT-IR spectrum of DMF:LiCl confirms the presence of C=O—Li contacts between lithium ions and soft carbonyl oxygen donors. The rhomb motif further interacts through neighboring equivalent ligands through CH—Cl hydrogen bonds (not shown, H—Cl distance=2.8-2.9 Å). CH—Cl hydrogen bonds are unusual, but have been previously reported (Aakeroy et al., 1999, New J of Chemistry 23, 145-152).

Despite the analogous Li$_2$Cl$_2$ rhomb structure, the 3D packing of these units is different in the two adducts (see FIG. 6). The DMF:LiCl crystal exhibits a linear arrangement of alternating Li—Cl and Li—O(DMF) rhombs arranged end to end through lithium atoms, such that a chain of closely spaced (3.03 Å) lithium ions exists parallel to the a axis of the unit cell. The chloride ion channels are therefore oriented parallel to the a axis as well, but with twice the spacing between these ions. In the py:LiCl structure, the Li2Cl2 units pack into edge-fused rhombs in a zigzag pattern, again along the α axis of the unit cell. This places lithium ions at a distance of 2.93 Å across the face of the rhomb, and 3.99 Å to the nearest Li in the neighboring rhomb.

Figure 8:
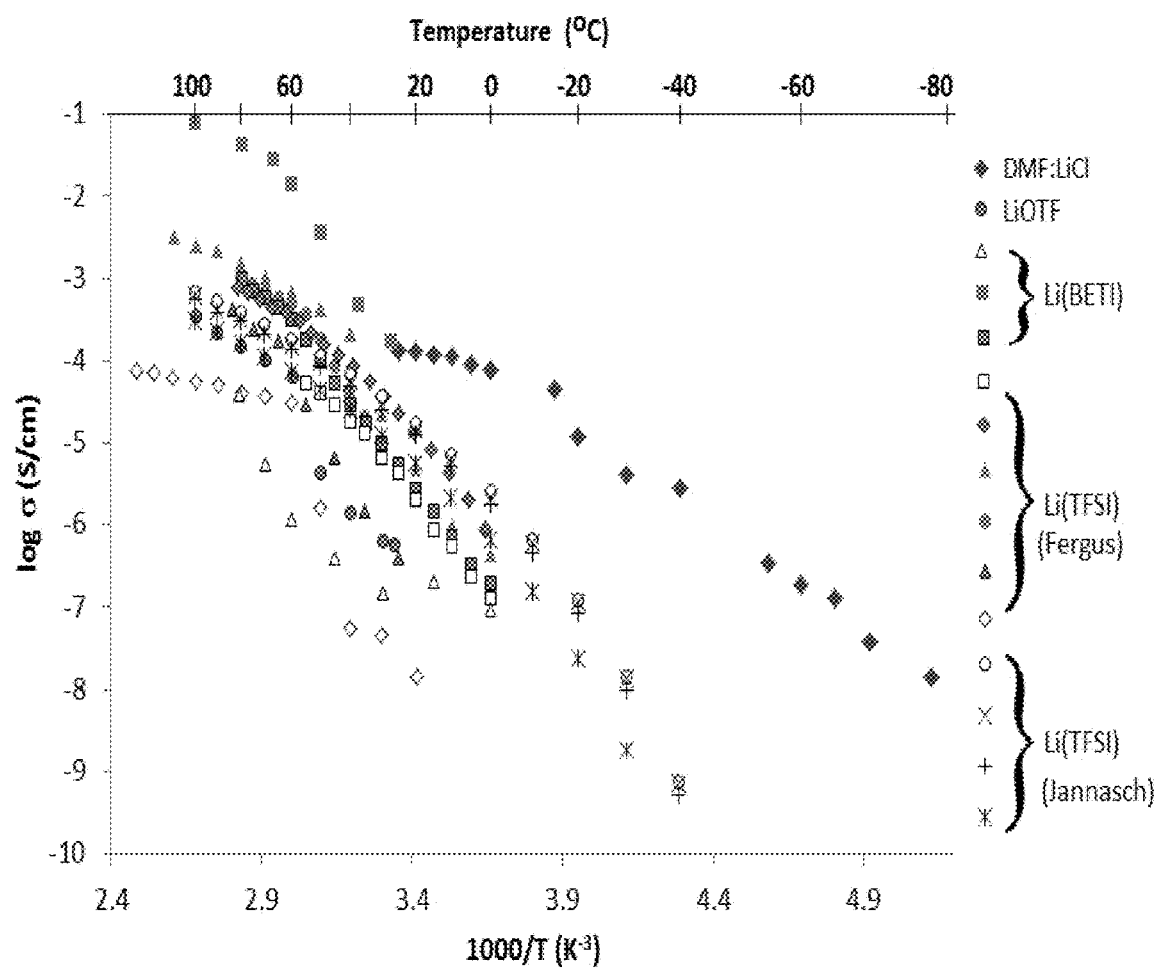
FIG. 8 is a plot of conductivity versus temperature of LiCl.DMF compared with PEO/LiX; Li(BETI)=LiN$(SO_2CF_2CF_3)_2$; Li(TFSI)=LiN$(SO_2CF_3)_2$ (see Fergus, 2010, J. of Power Sources, 195: 4554.; Jannasch, 2002, P. Chemistry of Materials, 14: 2718 for literature value data included in plot).

The compositions of the present invention exhibit excellent conductivities in comparison to soft solid electrolytes reported to date (Fergus, 2010, J of Power Sources 195, 4554-4569). In addition, these compositions are highly temperature independent for the measured AC conductivity, which shows a value of ~$10^{-4}$ S/cm at 20° C. (FIG. 8). This low temperature dependence is consistent with ion migration events with low activation barriers (14.2 kJ/mol in the room temperature region). The compound identity and crystallinity are well maintained over the course of the measurement based upon powder diffraction studies before and after the conductivity measurement (see FIGS. 9 and 10).

Figure 11:
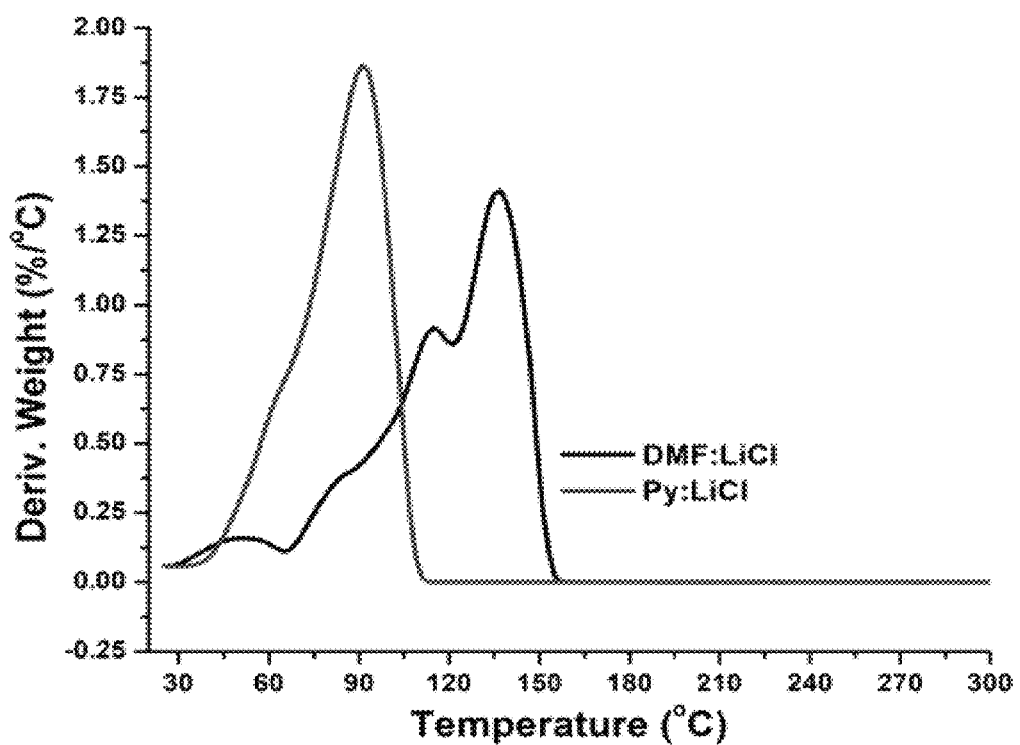
FIG. 11 is graph showing the Thermal Gravimentric Analysis (TGA) plots for DMF:LiCl (right peak) and Py:LiCl (left peak).

Thermal gravimetric analysis (TGA) on both DMF-LiCl and Py-LiCl indicates that the thermal stability of the salt-matrix co-crystal increases with increasing boiling point ($T_b$) of the matrix molecule. The TGA plots (see FIGS. 11 and 12) show that the decomposition temperature is slightly less than Tb of the pure liquids ($T_b$ of DMF =153° C., Py=115° C.). This can be attributed to the exotherm resulting from the formation of pure LiCl(s) from solid-solution phase $Li^+$ and $Cl^-$ ions upon sublimation of the matrix molecule from the solid lattice ($U_{latt(LiCl)}$=−829 kJ/mol), which lowers the decomposition temperature relative to the $T_b$ of the pure liquids.

Crystal Structure Report for Py-LiCl

A specimen of $C_5H_5ClLiN$, approximate dimensions 0.045 mm×0.090 mm×0.250 mm, was used for the X-ray crystallographic analysis. The X-ray intensity data were measured.

The integration of the data using an orthorhombic unit cell yielded a total of 2313 reflections to a maximum θ angle of 28.06° (0.76 Å resolution), of which 1328 were independent (average redundancy 1.742, completeness=98.5%, $R_{int}$=2.22%) and 1220 (91.87%) were greater than 2σ($F^2$). The final cell constants of a=3.9329(17) Å, b= 8.615(4) Å, c =17.836(7) Å, volume=604.3(4) Å$^3$, were based upon the refinement of the XYZ-centroids of reflections above 20 σ(I). The calculated minimum and maximum transmission coefficients (based on crystal size) were 0.5464 and 0.7456.

The structure was solved and refined using the Bruker SHELXTL Software Package, using the space group P 21 21 21, with Z=4 for the formula unit, $C_5H_5ClLiN$. The final anisotropic full-matrix least-squares refinement on $F^2$ with 74 variables converged at R1=2.93%, for the observed data and wR2=6.72% for all data. The goodness-of-fit was 1.058. The largest peak in the final difference electron density synthesis was 0.271 $e^-$/Å$^3$ and the largest hole was −0.222 $e^-$/Å$^3$ with an RMS deviation of 0.051 $e^-$/Å$^3$. On the basis of the final model, the calculated density was 1.335 g/cm$^3$ and F(000), 248 $e^-$.

Figure 13:
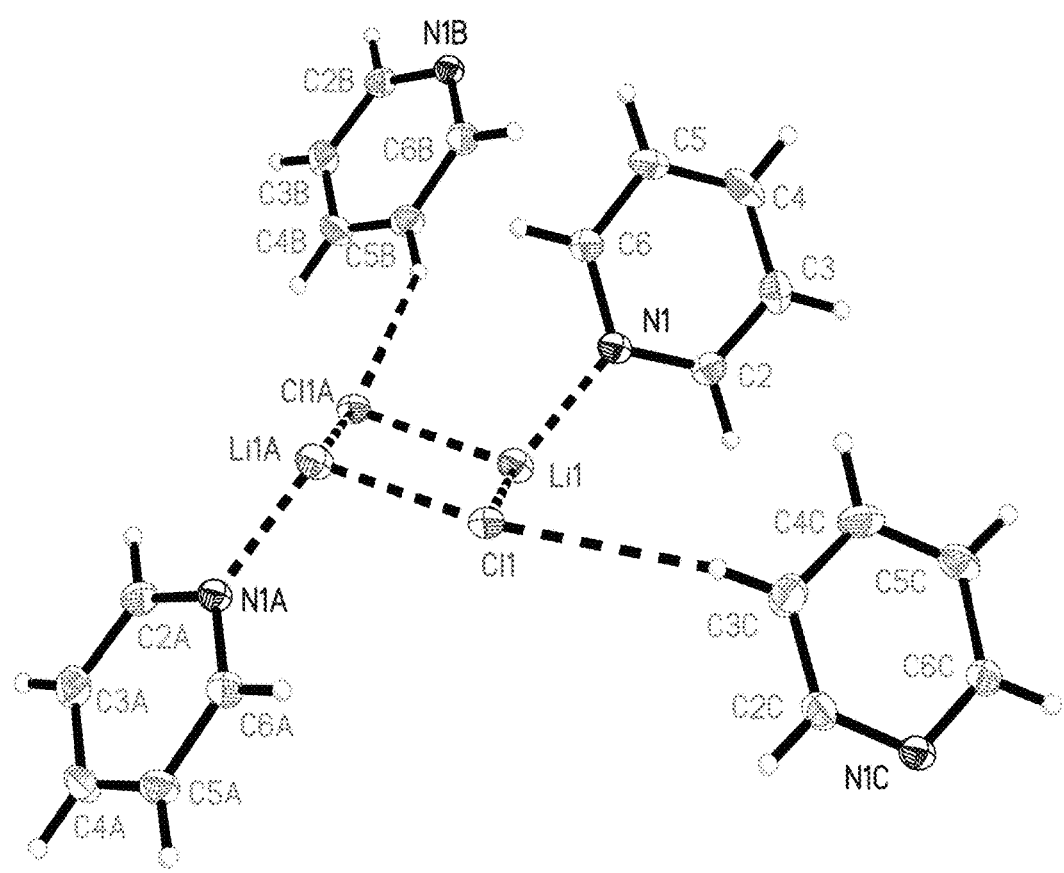
FIG. 13 is a thermal Ellipsoid plot of py.LiCl with neighboring symmetry equivalents. Ellipsoids set at 50% probability level. Hydrogens are shown as open circles.

A thermal ellipsoid plot of Py-LiCl is shown in FIG. 13, and related data is summarized in Tables 1-5.

TABLE 1

Sample and crystal data for pyLiCl.

| | |
|---|---|
| Identification code | pyLiCl |
| Chemical formula | $C_5H_5ClLiN$ |
| Formula weight | 121.49 |
| Temperature | 100(2) K |
| Wavelength | 0.71073 Å |
| Crystal size | 0.045 × 0.090 × 0.250 mm |
| Crystal system | orthorhombic |
| Space group | P 21 21 21 |
| Unit cell dimensions | a = 3.9329(17) Å  α = 90° |
| | b = 8.615(4) Å    β = 90° |
| | c = 17.836(7) Å   γ = 90° |
| Volume | 604.3(4) Å$^3$ |
| Z | 4 |
| Density (calculated) | 1.335 g/cm$^3$ |
| Absorption coefficient | 0.503 mm$^{-1}$ |
| F(000) | 248 |

TABLE 2

Data collection and structure refinement for pyLiCl.

| | |
|---|---|
| Theta range for data collection | 2.63 to 28.06° |
| Index ranges | −5 <= h <= 2, −11 <= k <= 7, −23 <= l <= 19 |
| Reflections collected | 2313 |
| Independent reflections | 1328 (R(int) = 0.0222) |
| Max. and min. transmission | 0.7456 and 0.5464 |
| Structure solution technique | direct methods |
| Structure solution program | SHELXS-2013 (Sheldrick, 2013) |
| Refinement method | Full-matrix least-squares on $F^2$ |
| Refinement program | SHELXL-2013 (Sheldrick, 2013) |
| Function minimized | $\Sigma\, w(F_o^2 - F_c^2)^2$ |
| Data/restraints/parameters | 1328/0/74 |
| Goodness-of-fit on $F^2$ | 1.058 |
| Final R indices | 1220 data; I > 2σ(I)    R1 = 0.0293, wR2 = 0.0652 |
| | all data            R1 = 0.0342, wR2 = 0.0672 |
| Weighting scheme | w = $1/(\sigma^2(F_o^2) + (0.0293P)^2 + 0.1143P)$ |
| | where P = $(F_o^2 + 2F_c^2)/3$ |
| Absolute structure parameter | 0.7(1) |
| Largest diff. peak and hole | 0.271 and −0.222 eÅ$^{-3}$ |
| R.M.S. deviation from mean | 0.051 eÅ$^{-3}$ |

TABLE 3

Atomic coordinates and equivalent isotropic atomic displacement parameters (Å$^2$) for pyLiCl.
U(eq) is defined as one third of the trace of the orthogonalized U$_{ij}$ tensor.

|     | x/a         | y/b        | z/c         | U(eq)       |
| --- | ----------- | ---------- | ----------- | ----------- |
| C2  | 0.2720(7)   | 0.9721(3)  | 0.17639(15) | 0.0215(6)   |
| C3  | 0.2302(6)   | 0.8315(3)  | 0.21251(14) | 0.0265(5)   |
| C4  | 0.3382(7)   | 0.6984(3)  | 0.17629(16) | 0.0273(6)   |
| C5  | 0.4889(7)   | 0.7114(3)  | 0.10677(14) | 0.0245(5)   |
| C6  | 0.5224(6)   | 0.8574(2)  | 0.07535(13) | 0.0218(5)   |
| N1  | 0.4162(5)   | 0.9877(2)  | 0.10886(11) | 0.0189(4)   |
| Cl1 | 0.96488(13) | 0.33881(6) | 0.07635(3)  | 0.01760(14) |
| Li1 | 0.4624(11)  | 0.1961(4)  | 0.0576(2)   | 0.0225(8)   |

TABLE 4

Bond lengths (Å) for pyLiCl.

| C2—N1   | 1.338(3) | C2—C3   | 1.382(4) |
| ------- | -------- | ------- | -------- |
| C3—C4   | 1.384(4) | C4—C5   | 1.379(4) |
| C5—C6   | 1.383(3) | C6—N1   | 1.339(3) |
| N1—Li1  | 2.022(4) | Cl1—Li1 | 2.335(4) |
| Cl1—Li1 | 2.351(4) | Cl1—Li1 | 2.409(4) |
| Li1—Cl1 | 2.335(4) | Li1—Cl1 | 2.409(4) |
| Li1—Li1 | 2.993(6) | Li1—Li1 | 2.993(6) |

TABLE 5

Bond angles (°) for pyLiCl.

| N1—C2—C3    | 123.9(2)   | C2—C3—C4    | 118.2(2)   |
| ----------- | ---------- | ----------- | ---------- |
| C5—C4—C3    | 119.0(2)   | C4—C5—C6    | 118.6(2)   |
| N1—C6—C5    | 123.5(2)   | C2—N1—C6    | 116.7(2)   |
| C2—N1—Li1   | 122.3(2)   | C6—N1—Li1   | 120.98(19) |
| Li1—Cl1—Li1 | 114.11(16) | Li1—Cl1—Li1 | 78.22(13)  |
| Li1—Cl1—Li1 | 77.92(13)  | N1—Li1—Cl1  | 109.13(19) |
| N1—Li1—Cl1  | 118.4(2)   | Cl1—Li1—Cl1 | 114.11(16) |
| N1—Li1—Cl1  | 109.74(17) | Cl1—Li1—Cl1 | 102.17(16) |
| Cl1—Li1—Cl1 | 101.69(15) | N1—Li1—Li1  | 130.2(2)   |
| Cl1—Li1—Cl1 | 119.0(2)   | Cl1—Li1—Li1 | 51.90(7)   |
| Cl1—Li1—Li1 | 49.79(14)  | N1—Li1—Li1  | 121.80(19) |
| Cl1—Li1—Li1 | 51.98(7)   | Cl1—Li1—Li1 | 119.2(2)   |
| Cl1—Li1—Li1 | 50.19(15)  | Li1—Li1—Li1 | 82.14(19)  |

Crystal Structure Report for DMFLiCl

A specimen of C$_3$H$_7$ClLiNO, approximate dimensions 0.055 mm×0.132 mm×0.255 mm, was used for the X-ray crystallographic analysis. The X-ray intensity data were measured.

The integration of the data using a monoclinic unit cell yielded a total of 4102 reflections to a maximum θ angle of 27.77° (0.76 Å resolution), of which 1394 were independent (average redundancy 2.943, completeness=99.8%, R$_{int}$=6.87%) and 862 (61.84%) were greater than 2σ(F$^2$). The final cell constants of a =5.839(2) Å, b =6.390(3) Å, c =15.961(7) Å, β98.826(6)°, volume=588.5(4) Å$^3$, were based upon the refinement of the XYZ-centroids of reflections above 20 σ(I). The calculated minimum and maximum transmission coefficients (based on crystal size) are 0.6103 and 0.7456.

The structure was solved and refined using the Bruker SHELXTL Software Package, using the space group P 1 21/c 1, with Z=4 for the formula unit, C$_3$H$_7$ClLiNO. The final anisotropic full-matrix least-squares refinement on F$^2$ with 66 variables converged at R1=5.39%, for the observed data and wR2=12.43% for all data. The goodness-of-fit was 1.009. The largest peak in the final difference electron density synthesis was 0.352 e$^-$/Å$^3$ and the largest hole was −0.683 e$^-$/Å$^3$ with an RMS deviation of 0.091 e$^-$/Å$^3$. On the basis of the final model, the calculated density was 1.304 g/cm$^3$ and F(000), 240 e$^-$.

Figure 14:
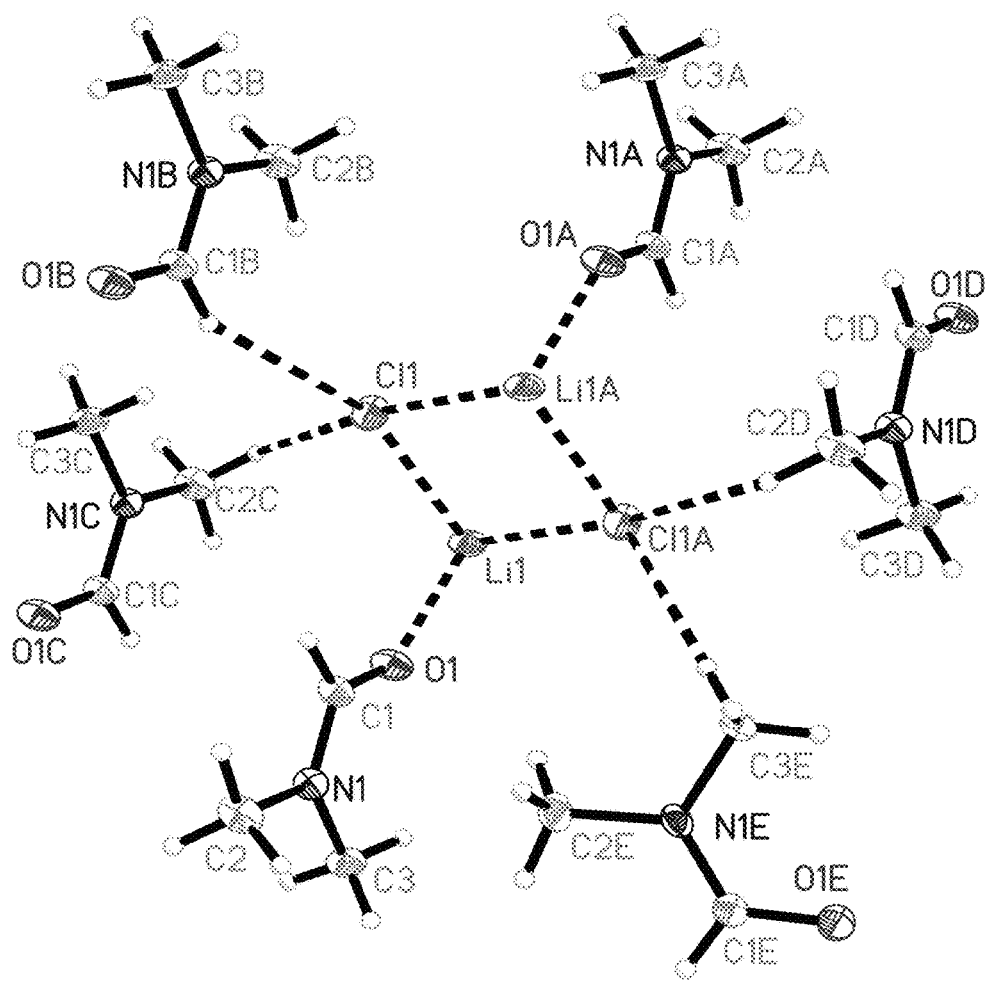
FIG. 14 is a thermal Ellipsoid plot of DMF.LiCl with neighboring symmetry equivalents. Ellipsoids set at 50% probability level. Hydrogens are shown as open circles.

A thermal ellipsoid plot of DMF-LiCl is shown in FIG. 14, and related data is summarized in Tables 6-10.

TABLE 6

Sample and crystal data for DMFLiCl.

| Identification code   | DMFLiCl                                      |
| --------------------- | -------------------------------------------- |
| Chemical formula      | C$_3$H$_7$ClLiNO                             |
| Formula weight        | 115.49                                       |
| Temperature           | 100(2) K                                     |
| Wavelength            | 0.71073 Å                                    |
| Crystal size          | 0.055 × 0.132 × 0.255 mm                     |
| Crystal system        | monoclinic                                   |
| Space group           | P 1 21/c 1                                   |
| Unit cell dimensions  | a = 5.839(2) Å    α = 90°                    |
|                       | b = 6.390(3) Å    β = 98.826(6)°             |
|                       | c = 15.961(7) Å   γ = 90°                    |
| Volume                | 588.5(4) Å$^3$                               |
| Z                     | 4                                            |
| Density (calculated)  | 1.304 g/cm$^3$                               |
| Absorption coefficient| 0.524 mm$^{-1}$                              |
| F(000)                | 240                                          |

TABLE 7

Data collection and structure refinement for DMFLiCl.

| Theta range for data collection | 2.58 to 27.77° |
| ------------------------------- | -------------- |
| Index ranges                    | −7 <= h <= 7, −8 <= k <= 4, −20 <= l <= 20 |
| Reflections collected           | 4102 |
| Independent reflections         | 1394 (R(int) = 0.0687) |
| Max. and min. transmission      | 0.7456 and 0.6103 |
| Structure solution technique    | direct methods |
| Structure solution program      | SHELXS-2013 (Sheldrick, 2013) |
| Refinement method               | Full-matrix least-squares on F$^2$ |
| Refinement program              | SHELXL-2013 (Sheldrick, 2013) |
| Function minimized              | Σ w(F$_o^2$ − F$_c^2$)$^2$ |
| Data/restraints/parameters      | 1394/0/66 |
| Goodness-of-fit on F$^2$        | 1.009 |
| Final R indices                 | 862 data; I > 2σ(I)   R1 = 0.0539, wR2 = 0.1082 |
|                                 | all data              R1 = 0.1076, wR2 = 0.1243 |
| Weighting scheme                | w = 1/(σ$^2$(F$_o^2$) + (0.0560P)$^2$) |
|                                 | where P = (F$_o^2$ + 2F$_c^2$)/3 |
| Largest diff. peak and hole     | 0.352 and −0.683 eÅ$^{-3}$ |
| R.M.S. deviation from mean      | 0.091 eÅ$^{-3}$ |

TABLE 8

Atomic coordinates and equivalent isotropic atomic displacement parameters (Å²) for DMFLiCl.
U(eq) is defined as one third of the trace of the orthogonalized $U_{ij}$ tensor.

|     | x/a         | y/b         | z/c         | U(eq)      |
|-----|-------------|-------------|-------------|------------|
| Cl1 | 0.03743(12) | 0.30001(13) | 0.57808(5)  | 0.0241(3)  |
| O1  | 0.4884(3)   | 0.3325(3)   | 0.44649(14) | 0.0223(5)  |
| N1  | 0.3642(4)   | 0.0859(4)   | 0.34631(16) | 0.0175(6)  |
| C1  | 0.5172(5)   | 0.1668(5)   | 0.4072(2)   | 0.0179(7)  |
| C2  | 0.4103(5)   | 0.8937(5)   | 0.3026(2)   | 0.0250(8)  |
| C3  | 0.1372(5)   | 0.1826(5)   | 0.3208(2)   | 0.0223(7)  |
| Li1 | 0.7427(8)   | 0.5045(9)   | 0.5048(3)   | 0.0216(13) |

TABLE 9

Bond lengths (Å) for DMFLiCl.

| Cl1—Li1 | 2.328(5) | Cl1—Li1 | 2.341(5) |
|---------|----------|---------|----------|
| O1—C1   | 1.254(4) | O1—Li1  | 1.957(5) |
| O1—Li1  | 1.963(6) | N1—C1   | 1.321(4) |
| N1—C2   | 1.458(4) | N1—C3   | 1.462(3) |
| C1—H1   | 0.95     | C2—H2A  | 0.98     |
| C2—H2B  | 0.98     | C2—H2C  | 0.98     |
| C3—H3A  | 0.98     | C3—H3B  | 0.98     |
| C3—H3C  | 0.98     | Li1—O1  | 1.957(5) |
| Li1—Cl1 | 2.341(5) | Li1—Li1 | 2.815(9) |
| Li1—Li1 | 3.033(9) |         |          |

TABLE 10

Bond angles (°) for DMFLiCl.

| Li1—Cl1—Li1 | 81.02(17) | C1—O1—Li1   | 143.2(2)  |
|-------------|-----------|-------------|-----------|
| C1—O1—Li1   | 124.0(2)  | Li1—O1—Li1  | 91.8(2)   |
| C1—N1—C2    | 121.9(3)  | C1—N1—C3    | 121.4(3)  |
| C2—N1—C3    | 116.7(3)  | O1—C1—N1    | 124.8(3)  |
| O1—C1—H1    | 117.6     | N1—C1—H1    | 117.6     |
| N1—C2—H2A   | 109.5     | N1—C2—H2B   | 109.5     |
| H2A—C2—H2B  | 109.5     | N1—C2—H2C   | 109.5     |
| H2A—C2—H2C  | 109.5     | H2B—C2—H2C  | 109.5     |
| N1—C3—H3A   | 109.5     | N1—C3—H3B   | 109.5     |
| H3A—C3—H3B  | 109.5     | N1—C3—H3C   | 109.5     |
| H3A—C3—H3C  | 109.5     | H3B—C3—H3C  | 109.5     |
| O1—Li1—O1   | 88.2(2)   | O1—Li1—Cl1  | 126.9(3)  |
| O1—Li1—Cl1  | 111.8(3)  | O1—Li1—Cl1  | 114.3(3)  |
| O1—Li1—Cl1  | 118.1(3)  | Cl1—Li1—Cl1 | 98.98(17) |
| O1—Li1—Li1  | 44.20(16) | O1—Li1—Li1  | 44.03(16) |
| Cl1—Li1—Li1 | 132.6(3)  | Cl1—Li1—Li1 | 127.9(3)  |
| O1—Li1—Li1  | 141.1(4)  | O1—Li1—Li1  | 130.4(3)  |
| Cl1—Li1—Li1 | 49.68(15) | Cl1—Li1—Li1 | 49.30(15) |
| Li1—Li1—Li1 | 173.6(4)  |             |           |

Example 2

Diphenylmethane-LiCl Cocrystals

A diphenylmethane (DPM)-LiCl cocrystal composition was prepared. The structure of diphenylmethane (DPM)-LiCl co-crystal is shown in FIG. 2. This structure represents a remarkable example of a solid solution of salt in a hydrocarbon matrix that has intersecting 2-D channels (at 44°) for Li⁺ ions, but only non-intersecting channels for Cl⁻ ions. Crystals with higher dimensionality channels provide a greater number of pathways for ion migration since ionic conductivity in one-dimensional systems can be restricted by just a few impurities or imperfections in the channels (Kudo and Fueki, 1990, Solid State Ionics, Kodansha Ltd; VCH: Tokyo; Weinheim). Although diphenylmethane is not polar (like DMF and Pyridine), the arenes are polarizable, permitting dipole-dipole interactions between the matrix and Li and Cl ions, allowing the formation of the ion molecule matrix. The DPM-LiCl crystal exhibits no significant ion-dipole interactions with the matrix, since they are situated next to nonpolar C—H bonds. While these C—H bonds are necessarily polarized and provide dipole-dipole contacts to ions (Aakeroy et al., 1999, New J of Chemistry 23, (2), 145-152; Youm et al., 2006, Polyhedron 25, (14), 2717-2720) the affinity of the matrix for the ions is likely much lower than that for heteroatoms in DMF, Py, or glyme systems (Zhang et al., 2007, Angewandte Chemie-International Edition, 46, (16), 2848-2850; Zhang et al., 2007, J of the American Chemical Society 129, (28), 8700-8701; Moriya et al., 2012, Chemistry-a European J 18, (48), 15305-15309), potentially leading to low-barrier ion migration.

Example 3

Preparation of Thin Films Comprising DMF-LiCl or Py-LiCl

Figure 15:
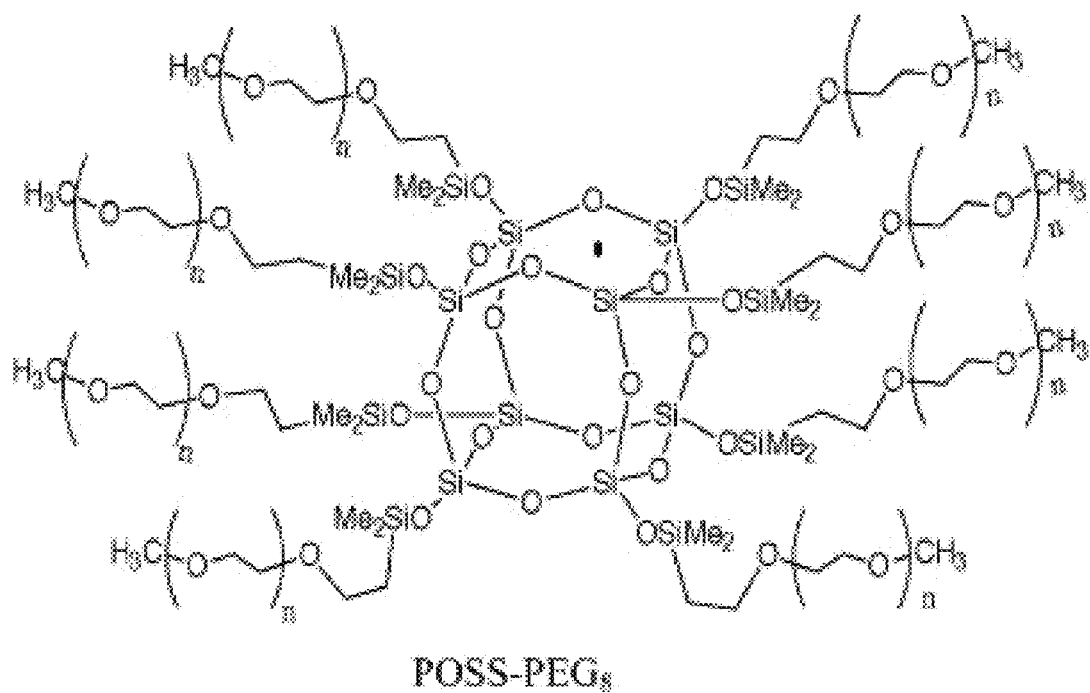
FIG. 15 is a diagram of the structure of polyoctahedral silsesquioxane functionalized with eight polyethylene glycol chains (POSS-$PEG_8$).
Figure 16:
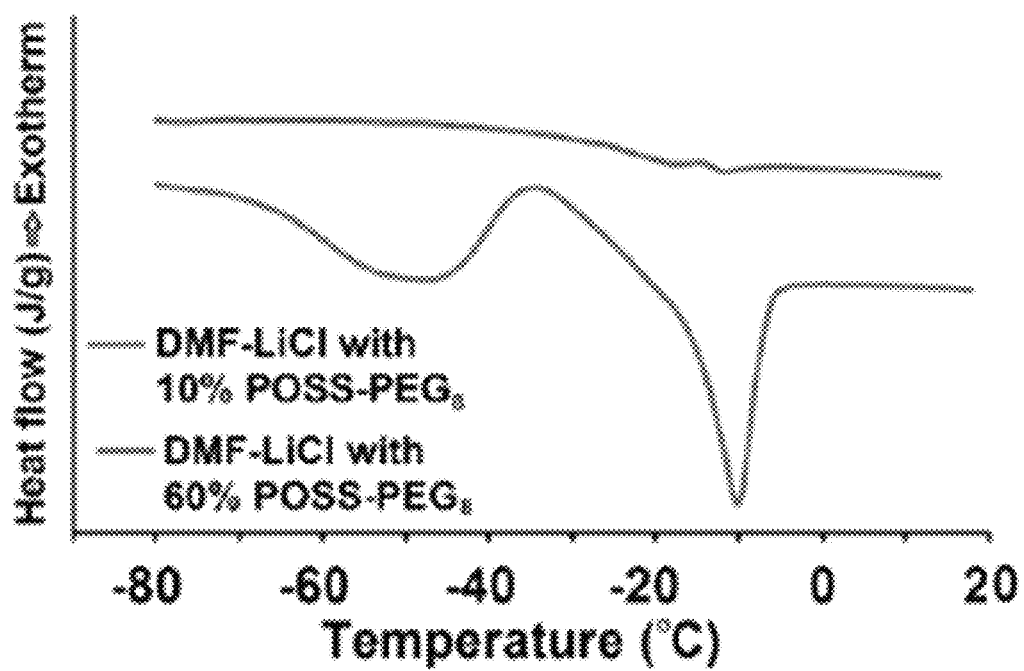
FIG. 16 is a differential scanning calorimetry plot of top: DMF-LiCl with 10% POSS-$PEG_8$ and bottom: DMF-LiCl with 60% POSS-$PEG_8$.
Figure 17:
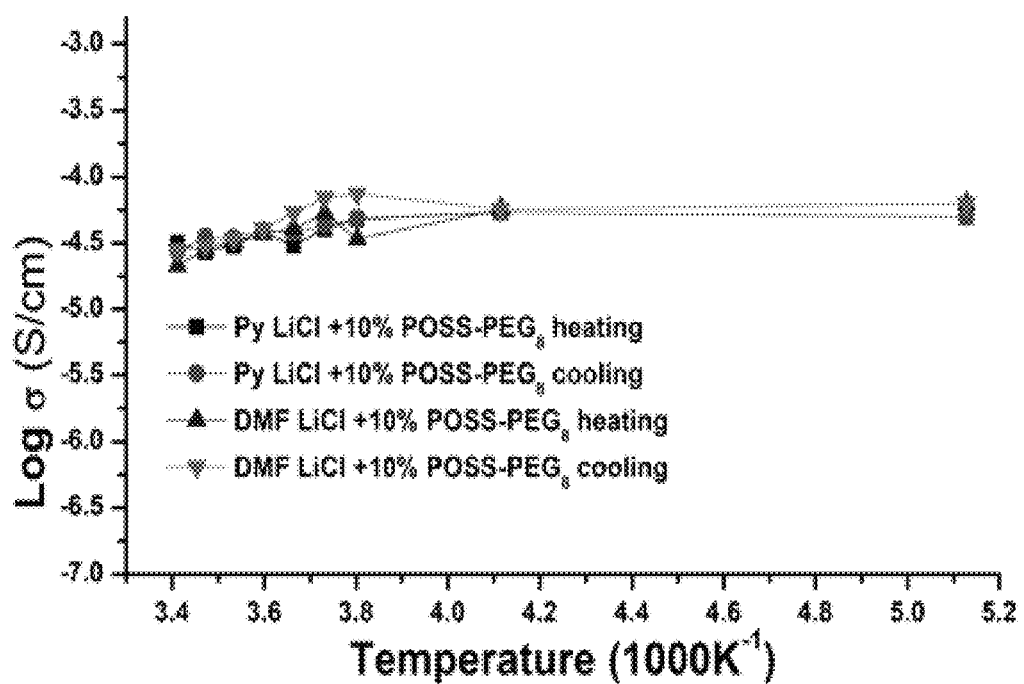
FIG. 17 is a temperature dependent conductivity plot for both heating and cooling of pressed DMF-LiCl and Py-LiCl pellets with 10% POSS-PEG.

Solid films were prepared by dissolving POSS-PEG$_8$ (the structure of POSS-PEG$_8$ is shown in FIG. 15) in diethyl ether and suspending crystals of either DMF-LiCl or Py-LiCl, so that after evaporation of the diethyl ether, there was 10 weight % POSS-PEG$_8$. All preparations were in an Ar purged glove box. After evaporation, the films were hard solids at −78° C. and rubbery solids at −30° C. DSC data show no crystallization of POSS-PEG$_8$, and increase in $T_g$ indicating Li⁺ solubility, and the same crystal structure of the DMF-LiCl as for the neat samples. Data from the analysis of thin films comprising DMF-LiCl or Py-LiCl and POSS-PEG$_8$ are shown in FIGS. 16 (DSC plots) and 17 (temperature dependent conductivity plots).

Example 4

Bulk-phase, Low-barrier Ion Conduction in Cocrystalline LiCl.N,N-Dimethylformamide Cocrystallization of LiCl with N,N-dimethylformamide (DMF) resulted in crystals with the composition LiCl.DMF. These crystals formed linear, parallel channels of ions in the crystallographic a direction. Conductivity measurements by electrochemical impedance spectroscopy gave a value of $1.3 \times 10^{-4}$ S/cm, the highest room temperature conductivity observed for an organic solid electrolyte. The material also exhibited a low activation barrier of 14 kJ/mol in the ambient temperature region from −15-25° C., and a lithium ion transference number of 0.25. Conductivity measurements on pellets prepared under different pressures and on samples containing the conductive binder pentacyclo [9.5.1.13,9.15,15.17,13]octasiloxane-polyethyleneglycol (POSS-PEG$_8$) indicated that conduction occurs in the bulk crystalline phase, with a percolating LiCl/DMF liquid layer at the grain boundaries, representing a major source of the measured resistivity as this layer froze.

The synthesis of materials and general experimental procedures were the same or similar to those described for LiCl.DMF in Experimental Example 1 above.

Figure 18:
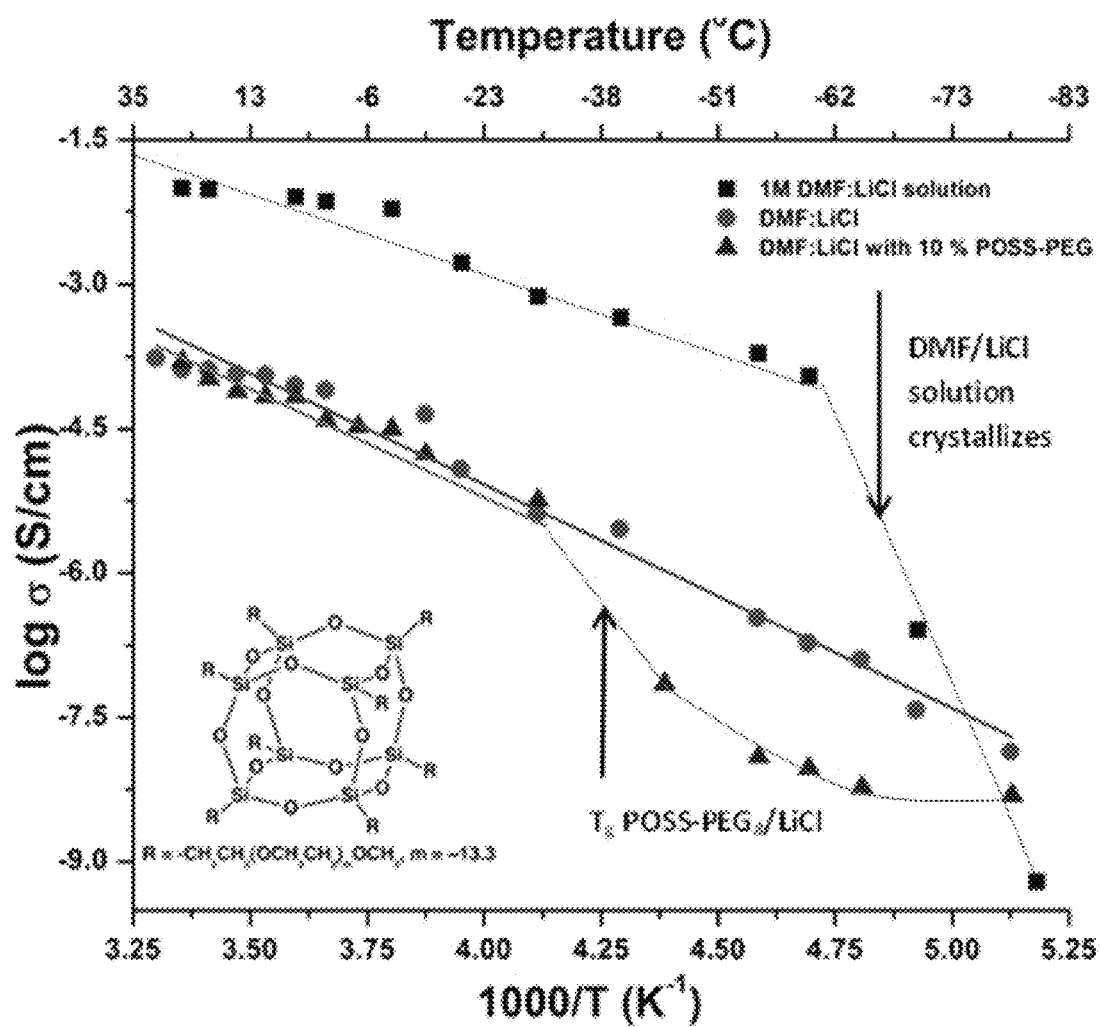
FIG. 18 is a plot of conductivity versus temperature of LiCl-DMF compared with LiCl:DMF solution electrolytes, and with 10% POSS-$PEG_8$; structure of POSS-$PEG_8$ shown.
Figure 19:
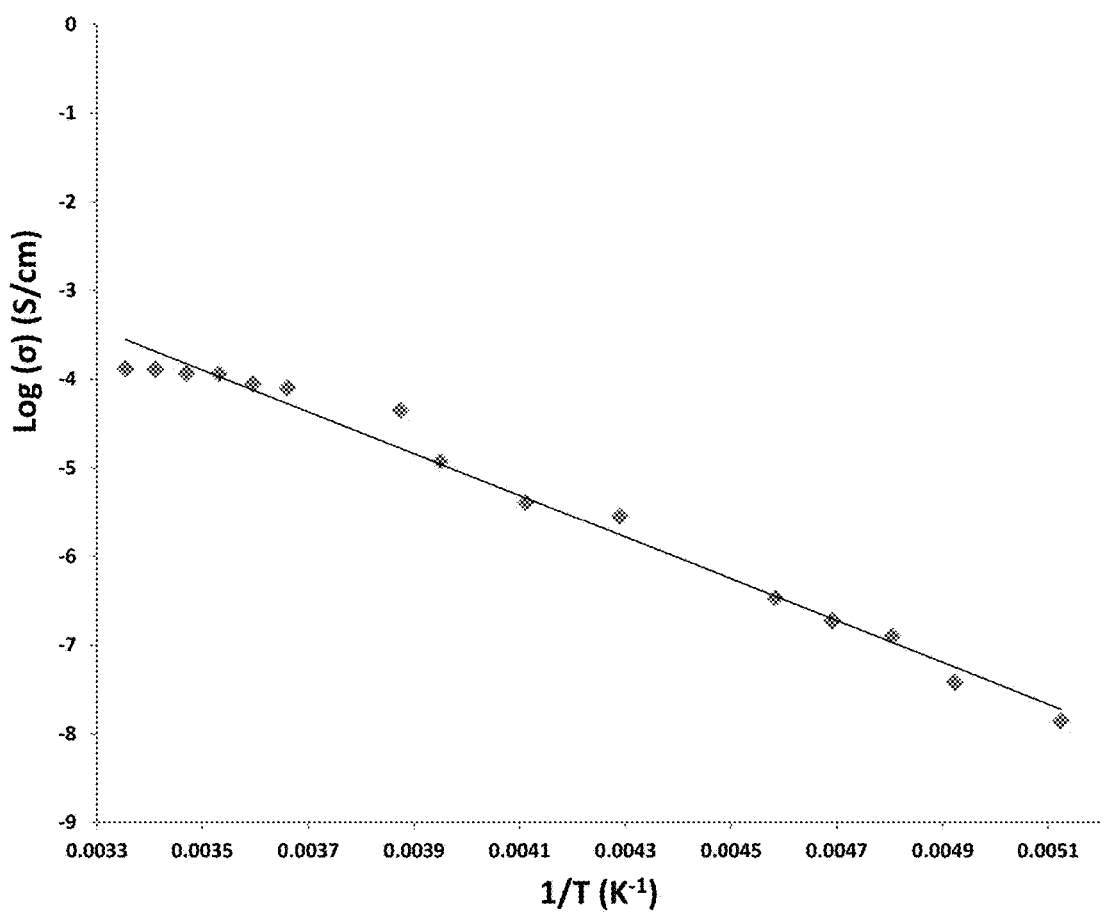
FIG. 19 is a plot of log conductivity (σ) versus 1/T graph for measuring activation energy by using Arrhenius equation for DMF:LiCl.

A pressed pellet of microcrystalline LiCl.DMF exhibited excellent conductivity compared with other soft solid electrolytes previously reported, with a room temperature conductivity of $1.3 \times 10^{-4}$ S/cm at 25° C. (FIG. 8). The measured conductivity had small temperature dependence. There appear to be two linear regions in the conductivity plot which give Arrhenius activation energies (see further description for activation energies calculated from conductivity data below) of 14.2 kJ/mol in the region between 25° C. and −15° C. and 48 kJ/mol between −25° C. and −78° C., or 45 kJ/mol over the whole temperature interval (FIG. 18), lower than typical polymer electrolyte values (50-100 kJ/mol at low temperatures) and similar to values measured for inorganic lithium conductors (25-60 kJ/mol (Knauth, 2009, Solid State Ionics 180: 911; Bron, et al., 2013, J. of the Am. Chem. Soc. 2013, 135: 15694)). The compound identity and crystallinity were well maintained over the course of the measurement based upon powder diffraction studies before and after the conductivity measurements (FIG. 19). The compounds decomposed at elevated temperatures (>40° C.). Thermal data, i.e. thermogravimetric analysis (TGA) (FIG. 12), on DMF*LiCl indicated that the decomposition temperature was slightly less than Tb of the pure liquid ($T_{vap}$ of DMF=153° C., $T_{max}$ of LiCl.DMF ~140° C., but starts to come off at lower temperatures). While not wishing to be bound by theory, this can be attributed to the exotherm resulting from the formation of pure LiCl(s) from solid-solution phase $Li^+$ and $Cl^-$ ions upon sublimation of the matrix molecule from the solid lattice ($U_{latt(LiCl)}$=−829 kJ/mol), which lowers the decomposition temperature relative to the Tb of the pure liquid.

Nyquist plots of impedance data for LiCl.DMF were composed of a single semicircle and a spike (FIG. 9), which can be attributed to combined bulk and grain boundary resistance, and electrode polarization due to ion blocking electrodes, respectively. In the case of inorganic Li conductors, two semicircles are sometimes observed (Bron, et al., 2013, J. of the Am. Chem. Soc. 2013, 135: 15694; Ohta et al., 2011, J. of Power Sources 196: 3342) (but not always, see Kamaya et al., 2011, Nature Materials 10: 682), and are attributed to bulk and grain boundary resistances. Unlike the case for inorganic crystals, where high temperature annealing (at ~500° C.) is used to improve contact between the grains, such approaches are not possible with the co-crystalline samples described here.

To assess the contribution of the grain boundary resistivity, sample pellets were prepared under different pressures and with different drying protocols. Pellets prepared under higher pressure (1500 psi) resulted in data with improved signal to noise ratios. Nyquist plots were less noisy in the low frequency region as the pressure used to make the pellets increased, consistent with significant resistivity resulting from poor grain contact. Further, excess drying resulted in decreased conductivities, suggesting that a boundary layer of liquid-like LiCl/DMF provided contact between the grains. TGA data (FIG. 12) showed three weight loss steps, which, while not wishing to be bound by theory, may be due to "bulk" DMF (which was removed from the pellets (~50° C.) before conductivity data was obtained), as well as DMF in a "grain boundary" layer (~120° C.) and in the crystal grains (~140° C.) themselves. A similar mechanism of percolating liquid mixed salt phase domains at grain boundaries, rather than solid state diffusion, has been proposed for conductivity increases in plastic crystalline salt-lithium salt mixtures, and also for plastic crystalline solvent-lithium salt mixtures and crystalline polymer electrolytes (Henderson et al., 2012, Advanced Energy Materials 2: 1343).

Figure 9:
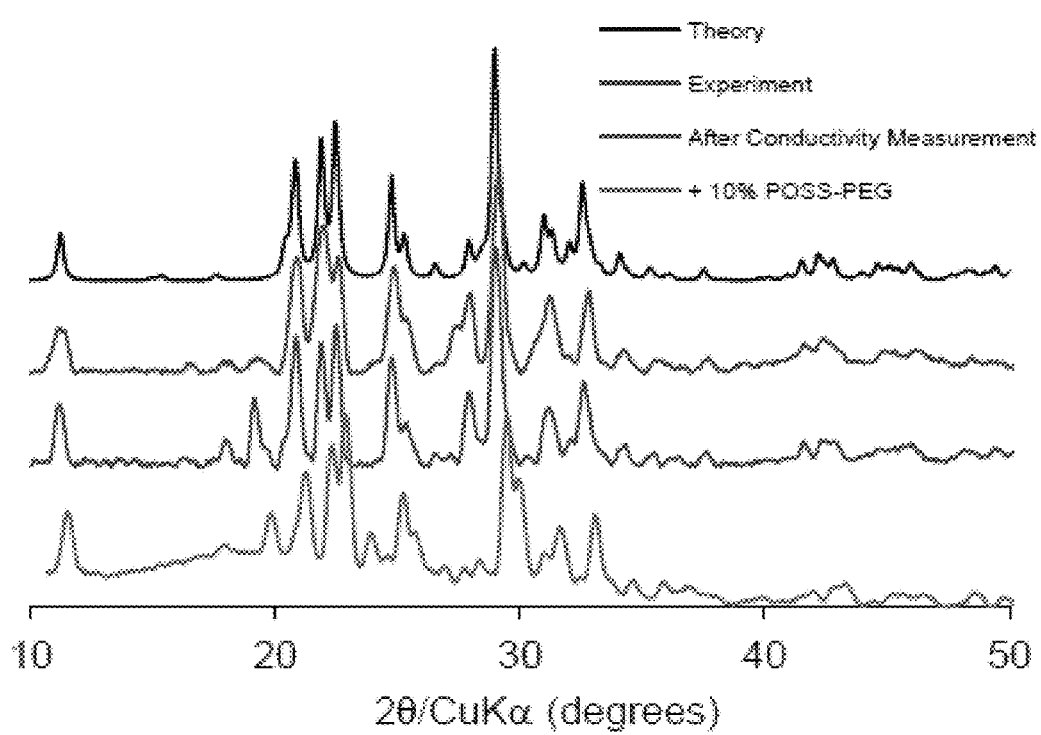
FIG. 9 is a set of labeled powder patterns of DMF:LiCl. Top curve: Theoretical pattern derived from the single crystal X-ray structure of DMF:LiCl. Second curve from top: Bulk sample before conductivity measurement. Third curve from top: Bulk sample after conductivity measurement. Bottom curve: powder sample with 10% POSS-$PEG_8$ (polyoctahedral silsesquioxane (POSS) functionalized with eight polyethylene glycol chains).
Figure 10:
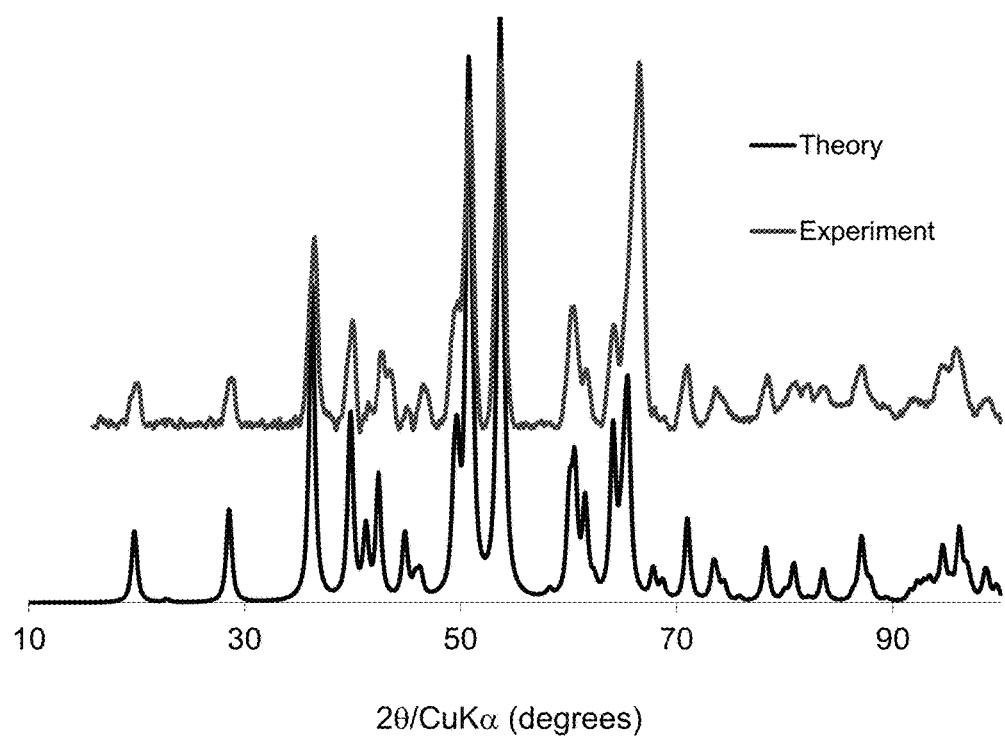
FIG. 10 is a set of powder patterns of py:LiCl. Bottom curve: Theoretical pattern derived from the single crystal X-ray structure of py:LiCl. Top curve: Bulk sample.
Figure 12:
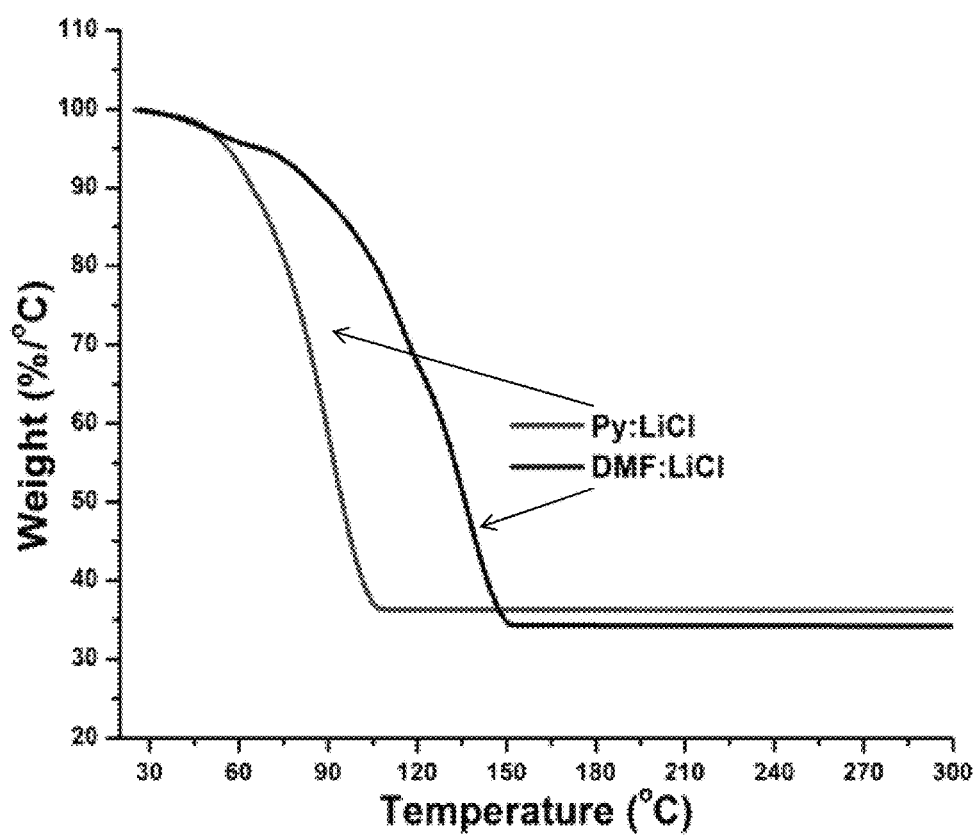
FIG. 12 is a TGA plot of LiCl crystal adducts.

A second test of the role of grain boundaries was the preparation of pellets with 10% of the conductive binder pentacyclo[9.5.1.13,9.15,15.17,13]octasiloxane-polyethyleneglycol (POSS-PEG$_8$). Conductivity plots (FIG. 18) of this material exhibited essentially identical conductivity values as the binder-free samples above the glass transition temperature ($T_g$) of the POSS-PEG$_8$ (FIG. 12), indicating that this liquid-like layer promoted conduction between the grains. However, the conductivity of the POSS-PEG$_8$-bound samples dropped precipitously at the glass transition temperature of POSS-PEG$_8$, suggesting that the glassy material at the grain boundaries limited the conductivity. Similarly, comparison of conductivity plots of 1 M LiCl/DMF solutions (FIG. 18) with the LiCl*DMF crystals indicated that the drop in conductivity at ~−70° C. was due to solidification of the liquid phase at the grain boundaries (FIG. 12). While not wishing to be bound by theory, these results suggest that while conduction of ions is through LiCl.DMF in the bulk crystalline phase, significant resistivity can occur at the grain boundaries The lithium ion transference number ($t_{Li}^+$) was 0.25 based upon impedance measurements using Li°(s) electrodes (FIG. 9). Interfacial resistance with Li° was high (FIG. 7) due to the known reactivity of lithium metal with DMF (Butler and Synnott, 1970, J. of the Am. Chem. Soc., 92: 2602). Although DMF has been investigated by itself (Croce et al., 1996, J. of the Electrochem. Soc., 143: 154), in mixed solvents (Tobishima et al., 1988, Electrochimica Acta, 33: 239) and in polymer gel electrolytes (Voice et al., 1994, Polymer 35: 3363) for conductivity studies of lithium ion batteries, it is not used in practical applications due to problems in electrode surface reactivity and passivation (*Advances in Lithium-Ion Batteries*; Springer US, 2002).

Activation Energies Calculated from Conductivity Data

Activation energies ($E_a$) were calculated using the Arrhenius equation, in two different temperature regions. In the high temperature region (25° C. to −15° C.) $E_a$=14.2 kJ/mol, in the low temperature region (−20° C. to −60° C.) Ea=48 kJ/mol, and over the whole temperature range (25° C. to −60° C.), $E_a$=45 kJ/mol. All are less than that obtained for crystalline solid glyme complexes made with [$CH_3O(CH_2CH_2O)_nCH_3$]:LiAsF$_6$ (n=3, 4), where $E_a$=55 kJ/mol (n=3) or 68 kJ/mol (n=4) over the temperature interval 0 to 50° C. While not wishing to be bound by theory, the linear variation of log(σ) versus 1/T suggests that the conduction mechanism is ion hopping between fixed sites, rather than the coupled dynamics between ions and polymer backbone motions that is better described by the VTF equation (Zhang et al., 2007, J. of the Am. Chem. Soc., 129(28): p. 8700-8701).

Transference Numbers

Figures 20A, 20B:
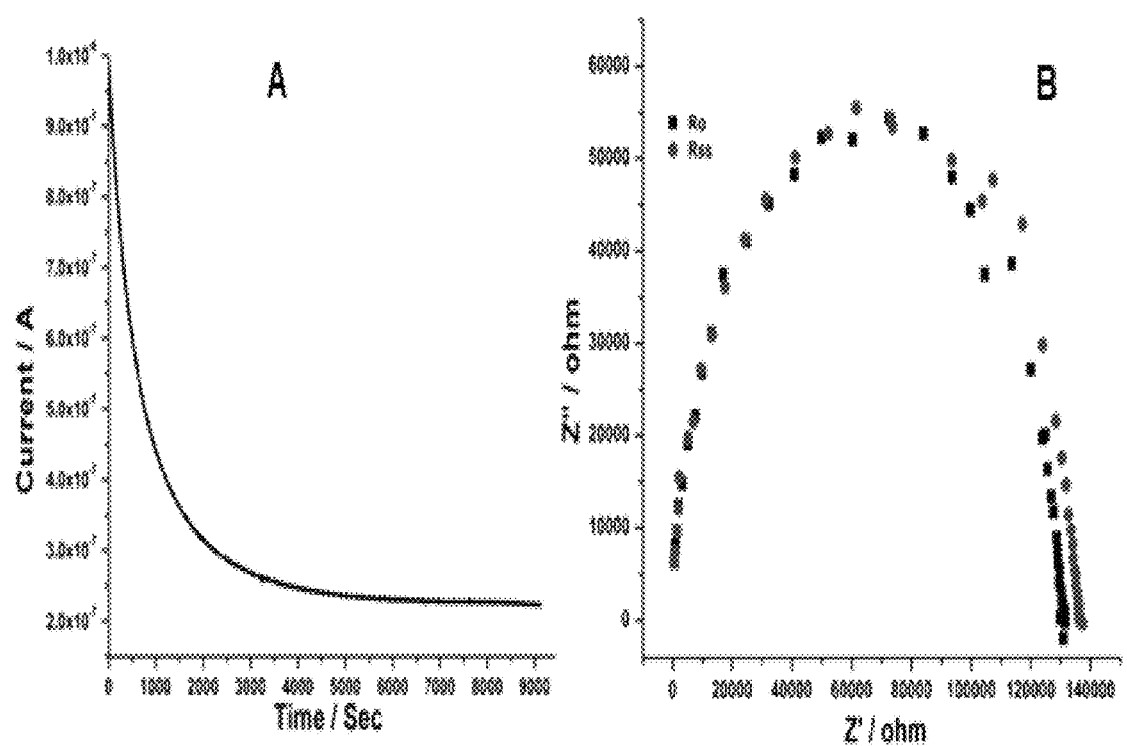
FIGS. 20A through 20C, is a set of plots for A) DC current as function of time with DC polarization voltage 30 my for Li°/DMF:LiCl with 10% POSS-PEG$_8$/Li° at 15° C.; B) Cole-Cole plots taken initially and after reaching steady state current, and C) Selected Cole-Cole plots of Li°/DMF:LiCl with 10% POSS-PEG$_8$/Li° as a function of storage time under open circuit condition at 15° C.
Figure 20C:
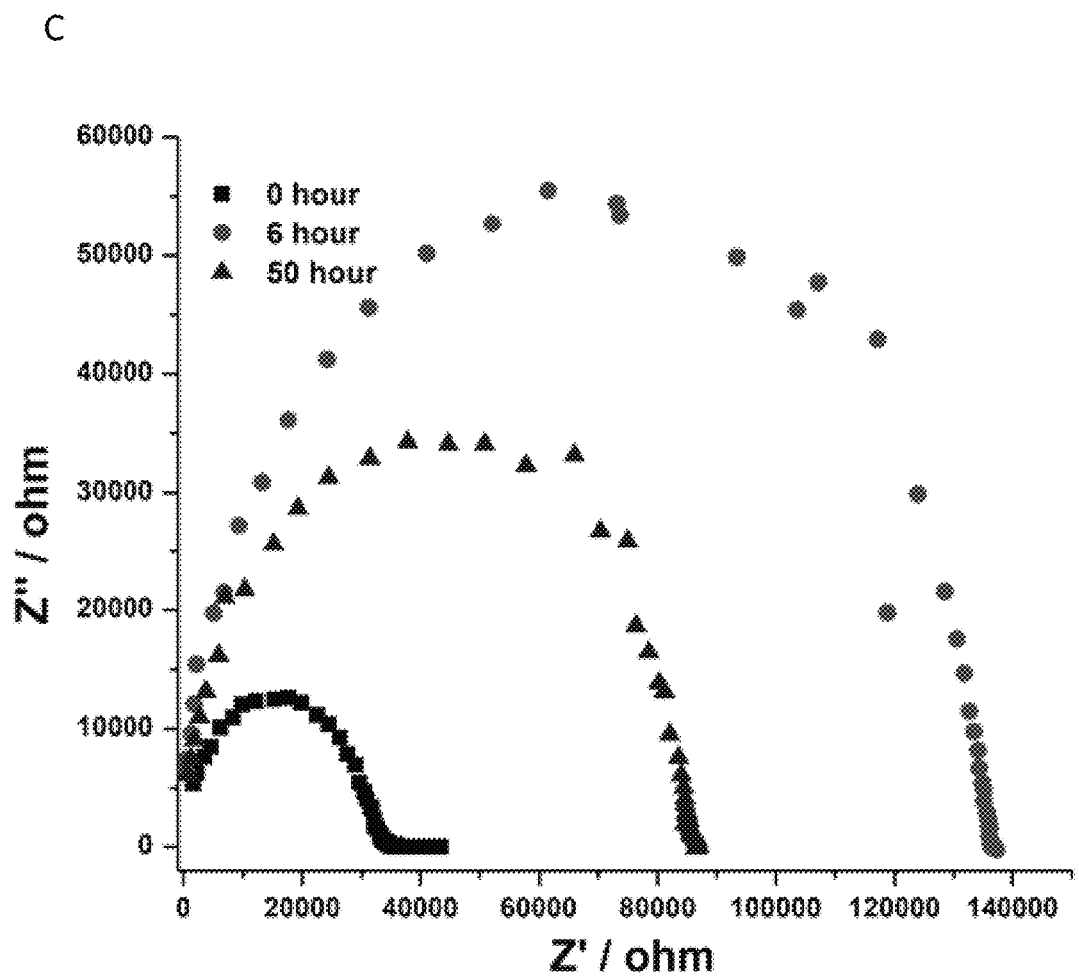

The transference numbers were measured for DMF:LiCl using symmetric lithium blocking electrodes at 15° C. (FIG. 20). Since DMF is corrosive to lithium metal, 10% POSS-PEG was added as a binder to limit contact of the DMF with lithium. The method developed by Vincent and coworkers (Evans et al., 1987, Polymer, 28(13): p. 2324-8) was used to calculate transference numbers as follows (Appetecchi et al., 1995, Electrochimica Acta, 40(8): p. 991-997; Heo et al., 2004, Electrochimica Acta, 50(2-3): p. 345-349):

$$t_{Li}^+ = I_{ss}(\Delta V - I_o R_o)/I_o(\Delta V - I_{ss} R_{ss})$$

After equilibrating the cell at 15° C. for almost three hours, the initial resistance, $R_o$ and current, $I_o$, which is due to both the anions and cations, were measured by electrochemical impedance spectroscopy (EIS), and a DC pulse (ΔV=30 mv) then applied to polarize the cell. The current was obtained as a function of time, and the steady state resistance ($R_{ss}$) and current ($I_{ss}$), now due to only the cations, measured. Here $R_o$ and $R_{ss}$ are the interfacial resistances of the passivating layers, i.e., the solid electrolyte interfaces formed between the lithium electrodes and DMF:LiCl with 10% POSS-PEG$_8$.

In order to use electrolytes in lithium ion batteries, high lithium ion transference numbers are desirable since they reduce cell polarization. For DMF:LiCl with 10% POSS-PEG$_8$, $t_{Li}^+$=0.28±0.03, higher than many commercial lithium ion battery electrolytes (Xu, 2004, Chemical Reviews, 104(10): 4303-4418) and polymer electrolytes (Agrawal and Pandey, 2008, J. of Physics D: Applied Physics, 41(22): 223001), but still indicating that most of the current is carried by the Cl$^-$ ions (FIGS. 21A and 21B). Interfacial Resistance In each cycle, lithium is lost and forms an interface between the electrolyte and anode (lithium) called the solid electrolyte interface (SEI) layer. For DMF:LiCl with 10% POSS-PEG$_8$ interfacial resistance increased for almost 6 hours and then decreased for 50 hours (FIG. 20C) and then remained constant (tested for another 100 hours). Upon opening the cell in an Argon purged glove box, the lithium metal looked dark in color (not the original shiny, metallic luster), indicating that the electrolyte reacted with the Li$^\circ$ metal, and was the reason for the large increase in interfacial resistance from 40 kΩ to 80 kΩ.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A soft-solid electrolyte composition comprising:
    a co-crystal of an ionic compound and an organic compound selected from the group consisting of organic solvents, carbonyl compounds, and aromatic hydrocarbons;
    wherein the co-crystal comprises ion channels; and
    wherein the composition is ionically conductive at ambient temperature.
2. The composition of claim 1, wherein the ionic compound is a lithium salt.
3. The composition of claim 2, wherein the lithium salt is lithium chloride.
4. The composition of claim 1, wherein the ionic compound is a sodium salt.
5. The composition of claim 4, wherein the sodium salt is sodium perchlorate.
6. The composition of claim 4, wherein the sodium salt is sodium hexafluorophosphate.
7. The composition of claim 1, wherein the organic solvent is N,N-dimethylformamide (DMF).
8. The composition of claim 1, wherein the organic solvent is pyridine.
9. The composition of claim 1, wherein the organic solvent is isoquinoline.
10. The composition of claim 1, wherein the carbonyl compound is selected from the group consisting of benzophenone, acetophenone, and phenylbenzoate.
11. The composition of claim 1, wherein the aromatic hydrocarbon is selected from the group consisting of diphenylmethane (DPM), triphenylmethane, bibenzyl, biphenyl, and naphthalene.
12. The composition of claim 1, wherein the organic compound is a soft Lewis donor.
13. The composition of claim 1, having a conductivity of at least about 1×10$^{-5}$S/cm.
14. A free-standing thin film electrolyte composition comprising:
    the soft-solid electrolyte composition of claim 1,
    and a binder.
15. The composition of claim 14, wherein the binder is polyethylene oxide (PEO).
16. The composition of claim 14, wherein the binder is polyoctahedral silsesquioxane functionalized with eight polyethylene glycol chains (POSS-PEG8).
17. A method for making a soft-solid electrolyte composition comprising the steps of:
    dissolving an ionic compound in an organic compound to form a solution, and
    adding a precipitating agent to the solution,
        wherein a co-crystal of the ionic compound and the organic compound is precipitated from the solution;
    wherein the organic compound is selected from the group consisting of organic solvents, carbonyl compounds, and aromatic hydrocarbons;
    wherein the co-crystal comprises ion channels; and
    wherein the composition is ionically conductive at ambient temperature.
18. The method of claim 17, further comprising the step of isolating the co-crystal.
19. The method of claim 17, further comprising the step of protecting the co-crystal from air.
20. The method of claim 17, further comprising the step of protecting the co-crystal from water.
21. The method of claim 17, wherein the ionic compound is a lithium salt.
22. The method of claim 21, wherein the lithium salt is lithium chloride.
23. The method of claim 17, wherein the ionic compound is a sodium salt.
24. The method of claim 23, wherein the sodium salt is sodium perchlorate or sodium hexafluorophosphate.
25. The method of claim 17, wherein the organic solvent is N,N-dimethylformamide (DMF).
26. The method of claim 17, wherein the organic solvent is pyridine.
27. The method of claim 17, wherein the carbonyl compound is selected from the group consisting of benzophenone, acetophenone, phenylbenzoate, and isoquinoline.
28. The method of claim 17, wherein the aromatic hydrocarbon is selected from the group consisting of diphenylmethane (DPM), triphenylmethane, bibenzyl, biphenyl, and naphthalene.
29. The method of claim 17, wherein the organic compound is polymerizable.
30. The method of claim 29, further comprising the step of polymerizing at least a portion of co-crystal.
31. A method for making a soft-solid electrolyte composition comprising the steps of:
    dissolving an ionic compound in an organic compound to form a solution, and
    reducing the temperature of the solution,
        wherein a co-crystal of the ionic compound and the organic compound is precipitated from the solution upon cooling;
    wherein the organic compound is selected from the group consisting of organic solvents, carbonyl compounds, and aromatic hydrocarbons;
    wherein the co-crystal comprises ion channels; and
    wherein the composition is ionically conductive at ambient temperature.

32. A method of making a soft-solid electrolyte composition comprising the steps of:
mixing an ionic compound with an organic compound to form a mixture,
heating the mixture to form a solution of the ionic compound in the organic compound; and
cooling the solution,
wherein a co-crystal of the ionic compound and the organic compound is precipitated from the solution upon cooling;
wherein the organic compound is selected from the group consisting of organic solvents, carbonyl compounds, and aromatic hydrocarbons;
wherein the co-crystal comprises ion channels; and
wherein the composition is ionically conductive at ambient temperature.

* * * * *